US010921346B2

(12) United States Patent
Iwai et al.

(10) Patent No.: US 10,921,346 B2
(45) Date of Patent: Feb. 16, 2021

(54) RESONANT SENSOR DEVICE

(71) Applicant: Yokogawa Electric Corporation, Tokyo (JP)

(72) Inventors: Shigeto Iwai, Tokyo (JP); Makoto Noro, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 0 days.

(21) Appl. No.: 16/693,485

(22) Filed: Nov. 25, 2019

(65) Prior Publication Data
US 2020/0166538 A1 May 28, 2020

(30) Foreign Application Priority Data
Nov. 28, 2018 (JP) .............................. JP2018-222340

(51) Int. Cl.
*G01P 15/097* (2006.01)
*G01P 15/08* (2006.01)

(52) U.S. Cl.
CPC .. *G01P 15/0975* (2013.01); *G01P 2015/0828* (2013.01)

(58) Field of Classification Search
CPC .................. G01P 15/0975; G01P 2015/0828
USPC ................................ 73/105, 514.01, 24.01
See application file for complete search history.

(56) References Cited

U.S. PATENT DOCUMENTS

| 5,228,341 | A | * | 7/1993 | Tsuchitani | G01D 5/2417 257/E21.218 |
| 6,000,280 | A | * | 12/1999 | Miller | G01P 15/125 73/105 |
| 6,073,484 | A | * | 6/2000 | Miller | G01B 5/28 73/105 |
| 2002/0074517 | A1 | * | 6/2002 | Krutchinsky | B82Y 15/00 250/492.1 |
| 2011/0100125 | A1 | * | 5/2011 | Sato | G01P 15/097 73/514.29 |
| 2012/0304769 | A1 | * | 12/2012 | Watanabe | G01P 15/0802 73/514.01 |
| 2013/0019682 | A1 | * | 1/2013 | Hsu | G01C 19/5719 73/514.01 |

(Continued)

FOREIGN PATENT DOCUMENTS

| JP | 2016-048225 A | 4/2016 |
| WO | 2006/039560 A2 | 4/2006 |

*Primary Examiner* — John Fitzgerald
*Assistant Examiner* — Rodney T Frank
(74) *Attorney, Agent, or Firm* — Sughrue Mion, PLLC

(57) ABSTRACT

A resonant sensor device includes a base and a detection substrate. The detection substrate includes a movable portion configured to move in a first direction, a supporter includes one or more supporting portions which extend in a direction along an intersecting plane intersecting the first direction, an intermediate fixing portion which is connected to the movable portion via the supporter, a connection portion which connects a mounting portion fixed to the base to the intermediate fixing portion in a second direction that is one direction along the intersecting plane, and a resonator at least partially embedded in the one or more supporting portions. The maximum dimension of the connection portion in a third direction orthogonal to the second direction in the intersecting plane is smaller than a maximum dimension of the supporter in the third direction.

20 Claims, 13 Drawing Sheets

(56) References Cited

U.S. PATENT DOCUMENTS

| | | | |
|---|---|---|---|
| 2014/0090471 A1* | 4/2014 | Hsu | G01C 19/5776 73/514.29 |
| 2016/0061857 A1* | 3/2016 | Yoshida | G01P 15/097 73/514.29 |

* cited by examiner

RESONANT SENSOR DEVICE

BACKGROUND

Technical Fields

The present invention relates to a resonant sensor device.
Priority is claimed on Japanese Patent Application No. 2018-222340, filed on Nov. 28, 2018, the contents of which are incorporated herein by reference.

Related Art

For example, as shown in Japanese Unexamined Patent Application Publication No. 2016-48225, a resonant sensor device includes a weight having a predetermined weight, a spring portion supporting the weight, and a resonator embedded in the spring portion, and is a device that measures acceleration by detecting a change in resonance frequency of the resonator caused by, for example, a strain of the spring portion that is generated in proportion to an acceleration. The resonant sensor device disclosed in Japanese Unexamined Patent Application Publication No. 2016-48225 includes a damping member for forming a gap adjusted to a predetermined pressure between the damping member and the weight. A detection substrate on which the weight and the spring portion are formed is connected to the damping member by fixing a fixing portion provided around the weight and the spring portion to the damping member. In the resonant sensor device disclosed in Japanese Unexamined Patent Application Publication No. 2016-48225, the entire region excluding the weight and the spring portion becomes the fixing portion, and the entire fixing portion is fixed to the damping member.

However, in the resonant sensor device in which the detection substrate on which the weight and the spring portion are formed is fixed to a base such as the damping member, thermal stress is generated at a joint between the detection substrate and the base due to temperature change resulting from a difference in linear expansion coefficient between the detection substrate and the base. Further, stress may be generated as a result of an external force being applied to the base for a certain reason. Strain caused by such thermal stress or stress due to an external force is transmitted to a supporting portion in which a resonator is embedded such as the spring portion, and causes measurement errors.

SUMMARY

A resonant sensor device may include a base, and a detection substrate supported by being at least partially fixed to the base. The detection substrate may include a movable portion, a supporter, an intermediate fixing portion, a connection portion, and a resonator. The movable portion may move in a first direction, and is disposed away from the base in the first direction. The supporter may include one or more supporting portions which extend in a direction along an intersecting plane intersecting the first direction. The supporter may be disposed away from the base in the first direction. The intermediate fixing portion may be connected to the movable portion via the supporter. The intermediate fixing portion may be disposed away from the base in the first direction. The connection portion connects a mounting portion fixed to the base to the intermediate fixing portion in a second direction that is one direction along the intersecting plane. The connection portion may be disposed away from the base in the first direction. The resonator may be at least partially embedded in the one or more supporting portions. A maximum dimension of the connection portion in a third direction orthogonal to the second direction in the intersecting plane may be smaller than a maximum dimension of the supporter in the third direction.

Further features and aspects of the present disclosure will become apparent from the following detailed description of exemplary embodiments with reference to the attached drawings.

DETAILED DESCRIPTION OF THE EMBODIMENTS

Figure 1A:
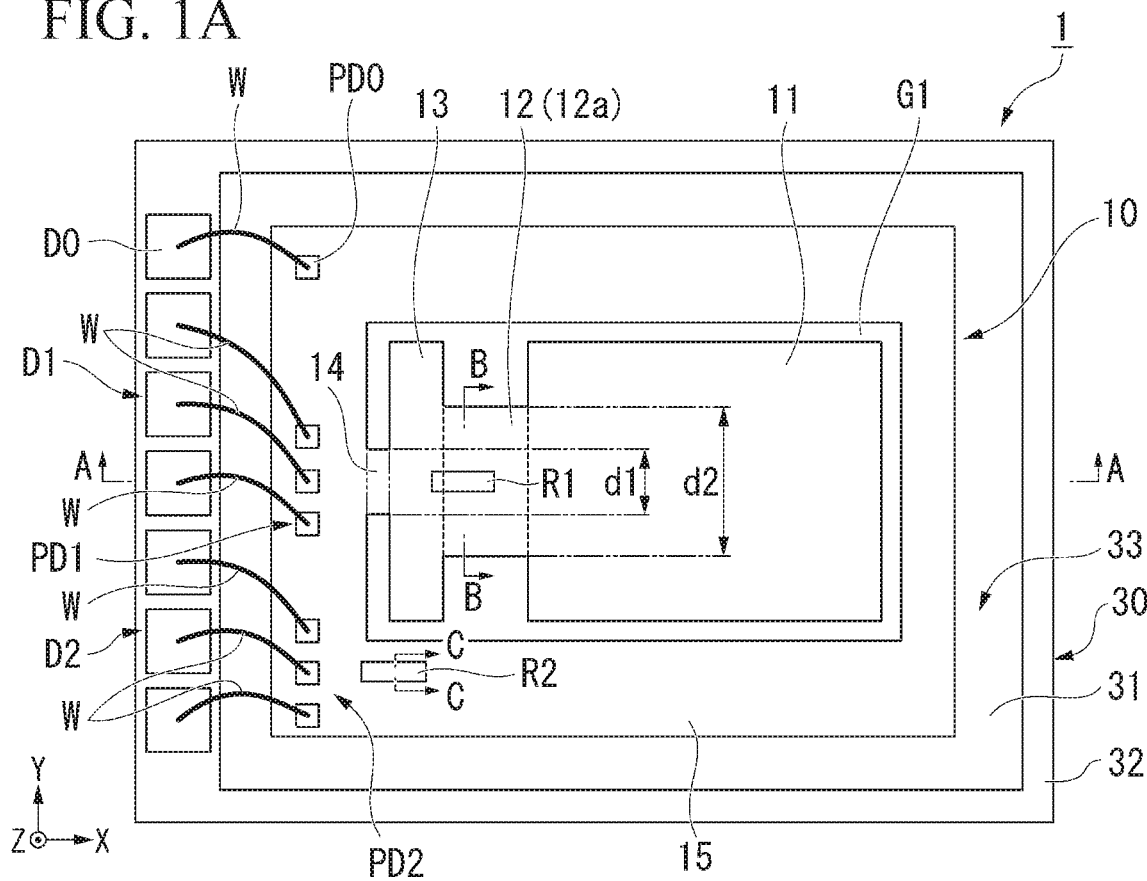
FIG. 1A is a diagram showing a resonant sensor device according to a first embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a resonant sensor device that can inhibit strain caused by thermal stress, stress due to an external force, or the like from being transmitted to a supporting portion, and maximize the inherently high accuracy performance thereof.

Hereinafter, one embodiment of a resonant sensor device according to the present invention will be described with reference to the drawings. In the following description, an overview of embodiments of the present invention will be described first, and details of each embodiment of the present invention will be described subsequently. In addition, although the resonant sensor device according to the embodiments of the present invention can measure jerk, acceleration, speed, displacement, etc., it will be described as a device for measuring acceleration in the following description for easy understanding. Further, in the following description, positional relationships between respective members will be described with reference to a XYZ orthogonal coordinate system (a position of the origin may be changed as appropriate) set in the drawings as necessary.

(Overview)

In the embodiments of the present invention, a connection portion, an intermediate fixing portion, a supporter, and a movable portion are disposed in a state of being separated from a base, only the connection portion of these portions being directly connected to a mounting portion fixed to the base. For this reason, strain caused by thermal stress, stress due to an external force, or the like is input to a supporter only through the connection portion. Further, since a maximum dimension of the connection portion in a third direction orthogonal to a direction (a second direction) connected to the mounting portion is smaller than a maximum dimension of the supporter in the same direction, it becomes possible to reduce a width of a strain transmission path as compared to a case where the mounting portion is directly connected to the movable portion by the supporter. For this reason, it is possible to prevent strain caused by thermal stress, stress due to an external force, or the like from being transmitted to a supporting portion in which a resonator is embedded.

In addition, for example, in a case in which the mounting portion is directly connected to the movable portion with the supporting portion, strain caused by thermal stress, stress due to an external force, or the like can be inhibited from being transmitted to the supporting portion as a width dimension (dimension in the third direction) of the supporting portion is reduced. However, since rigidity of the supporting portion reduces as the width dimension of the supporting portion becomes smaller, movements of the movable portion in directions other than a sensitivity axis direction cannot be inhibited, whereby the movable portion performs a swinging motion in an intersecting plane intersecting the sensitivity axis direction. Such a swinging motion of the movable portion in the intersecting plane causes measurement errors. On the other hand, according to the embodiments of the present invention, the maximum dimension of the connection portion in the third direction orthogonal to the direction (second direction) connected to the mounting portion is smaller than the maximum dimension of the supporter in the same direction. That is, the maximum dimension of the supporter in the third direction is wider than the maximum dimension of the connection portion in the same direction. For this reason, movements of the movable portion in the third direction and the second direction, that is, movements of the movable portion in the intersecting plane can be inhibited as compared to a case where the maximum dimension of the supporter in the third direction is equal to or less than the maximum dimension of the connection portion in the same direction. That is, according to the embodiments of the present invention, movement of the movable portion is allowed only in the first direction and the swinging motion of the movable portion in the intersecting plane intersecting the first direction can be inhibited. Therefore, according to embodiments of the present invention, by configuring the movable portion to be movable only in the first direction that becomes a sensitivity axis for acceleration or the like, measurement errors due to the swinging motion of the movable portion can be reduced, whereby it is possible to provide the maximum measurement performance of the resonator.

Therefore, according to the embodiments of the present invention, in the resonant sensor device, by preventing strain caused by thermal stress, stress due to an external force, or the like from being transmitted to the supporting portion, it is possible to maximize the inherently high accuracy performance thereof.

First Embodiment

<Resonant Sensor Device>

Figure 1B:
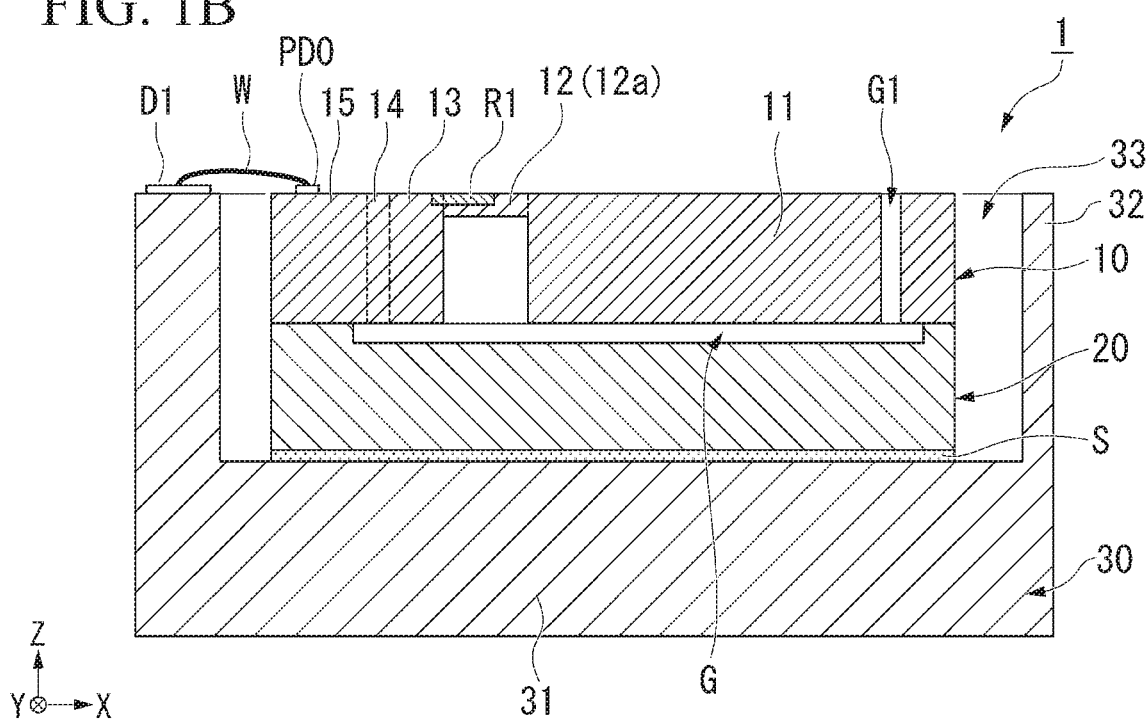
FIG. 1B is a diagram showing a resonant sensor device according to a first embodiment of the present invention.

FIG. 1A and FIG. 1B are diagrams showing a resonant sensor device according to a first embodiment of the present invention. FIG. 1A is a plan view, and FIG. 1B is a cross-sectional view taken along line A-A in FIG. A. The resonant sensor device 1 of the present embodiment is a device that measures acceleration acting on the resonant sensor device 1, and includes an acceleration detection substrate 10 (a detection substrate), a damping member 20, and a package 30, as shown in the above figures. In addition, the resonant sensor device 1 is configured to have the highest measurement sensitivity of acceleration in the Z direction.

The acceleration detection substrate 10 is configured of a silicon substrate made of a silicon material, and a weight 11 (a movable portion), a supporter 12, an intermediate fixing portion 13, a connection portion 14, a mounting frame 15 (a mounting portion), an acceleration detecting resonator R1 (a resonator), a temperature detecting resonator R2, and aluminum pads PD0-PD2 (pads) are formed thereon. This acceleration detection substrate 10 is designed such that strain proportional to the acceleration (acceleration in the Z direction) acting on the resonant sensor device 1 is generated in a spring portion 12a constituting the supporter 12 and a resonance frequency of the acceleration detecting resonator R1 changes due to the strain generated in the spring portion 12a. In addition, the acceleration acting on the resonant sensor device 1 is obtained from the change in resonance frequency of the acceleration detecting resonator R1.

The weight 11 is formed by processing a silicon substrate made of a silicon material, and has a predetermined weight. One end portion (in the example shown in FIG. 1A and FIG. 1B, an end portion in the -X direction) of the weight 11 is connected to the intermediate fixing portion 13 by the spring portion 12a, while the remaining end portion thereof is separated from the mounting frame 15 with a gap G1 therebetween. Thus, the weight 11 is movable in the Z direction (first direction) that is a direction in which the resonant sensor device 1 has the highest measurement sensitivity. That is, the moving direction of the weight 11 is set in the Z direction.

The supporter 12 is configured of the single spring portion 12a (supporting portion) in the present embodiment. The spring portion 12a is connected to one end portion of the weight 11 and one end portion (in the example shown in FIG. 1A and FIG. 1B, an end portion in the +X direction) of the intermediate fixing portion 13. The spring portion 12a supports the weight 11 in a state of being separated from the damping member 20 in the Z direction, and allows the weight 11 to move relative to the intermediate fixing portion 13 in the Z direction. Further, a thickness dimension (a dimension in the Z direction) of the spring portion 12a is reduced to be smaller than those of the weight 11, the intermediate fixing portion 13, the connection portion 14, and the mounting frame 15, and the spring portion 12a is formed to extend in the X direction (second direction). That is, the spring portion 12a is formed to extend in the X direction that is one direction along a XY plane which is an intersecting plane intersecting the Z direction. The weight 11 is relatively displaced with respect to the intermediate fixing portion 13 in the Z direction, whereby strain is generated in the spring portion 12a. In addition, the spring portion 12a is formed integrally with the weight 11, the intermediate fixing portion 13, the connection portion 14, and the mounting frame 15 by processing a silicon substrate.

The intermediate fixing portion 13 is connected to one end portion of the spring portion 12a and one end portion (in the example shown in FIG. 1A and FIG. 1B, an end portion in the +X direction) of the connection portion 14 and supports the spring portion 12a in a state of being separated from the damping member 20 in the Z direction. That is, the intermediate fixing portion 13 is connected to the weight 11 via the supporter 12. In addition, the intermediate fixing portion 13 is supported by the connection portion 14 and thus is disposed away from the damping member 20 in the Z direction. The intermediate fixing portion 13 has the same thickness dimension (dimension in the Z direction) as those of the weight 11, the connection portion 14, and the mounting frame 15, and the thickness dimension is larger than the thickness dimension of the spring portion 12a. Further, the intermediate fixing portion 13 is formed by processing a silicon substrate.

Moreover, a width dimension (a dimension in the Y direction) of the intermediate fixing portion 13 is the same as that of the weight 11 and is larger than a width dimension (a dimension in the Y direction) of the spring portion 12a. By making the width dimension of the intermediate fixing portion 13 larger than the width dimension (dimension in the Y direction) of the spring portion 12a, rigidity of the intermediate fixing portion 13 is increased as compared to a case where the width dimension of the intermediate fixing portion 13 is the same as the width dimension of the spring portion 12a, whereby the intermediate fixing portion 13 is prevented from being bent in the XY plane. Therefore, the weight 11 can be inhibited from moving in the XY plane.

The connection portion 14 is connected to one end portion of the intermediate fixing portion 13 and the mounting frame 15 and supports the intermediate fixing portion 13 in a state of being separated from the damping member 20 in the Z direction. The connection portion 14 connects the mounting frame 15 fixed to the damping member 20 to the intermediate fixing portion 13 in the X direction. Further, the connection portion 14 is supported by the mounting frame 15, and thus is disposed away from the damping member 20 in the Z direction. The connection portion 14 has the same thickness dimension (dimension in the Z direction) as those of the weight 11, the intermediate fixing portion 13, and the mounting frame 15, and the thickness dimension is larger than the thickness dimension of the spring portion 12a. For this reason, by increasing rigidity of the connection portion 14 as compared to a case where the thickness dimension of the connecting portion 14 is smaller, a swinging motion of the weight 11 in the XY plane starting from the connection portion 14 can be inhibited, and thus measurement errors can be further reduced. In addition, the connection portion 14 is formed by processing a silicon substrate.

Also, a width dimension (a maximum dimension d1), which is a dimension in the Y direction, of the connection portion 14 is smaller than the width dimension of the spring portion 12a. In the present embodiment, since the supporter 12 includes the single spring portion 12a, a width dimension (a maximum dimension d2) of the supporter 12 is equal to the width dimension of the spring portion 12a. That is, in the resonant sensor device 1 of the present embodiment, the maximum dimension d1 of the connection portion 14 is smaller than the maximum dimension d2 of the supporter 12.

In addition, as will be described in an embodiment described later, a case in which the supporter 12 is configured of a plurality of spring portions is also conceivable. In this case, the width dimension of the supporter 12 becomes a separation distance (a maximum dimension) from an endmost position of the supporter 12 in the +Y direction to an endmost position of the supporter 12 in the −Y direction in a state where all the parts constituting the supporter 12 are included. At this time, a maximum dimension of the connection portion 14 in the Y direction is smaller than a maximum dimension of the supporter 12 in the Y direction. As will be described in more detail later, in this way, by making the maximum dimension of the connection portion 14 in the Y direction smaller than the maximum dimension of the supporter 12 in the Y direction, strain caused by thermal stress, stress due to an external force, or the like can be inhibited from being transmitted to the supporter 12 (spring portion 12a).

The mounting frame 15 is a member that supports the weight 11, the supporter 12 (spring portion 12a), the intermediate fixing portion 13 and the connection portion 14 directly or indirectly and is formed in a quadrangular ring shape by processing a silicon substrate to surround a periphery of the weight 11 in the XY plane. As shown in FIG. 1B, in the acceleration detection substrate 10, the mounting frame 15 is only directly fixed to the damping member 20. That is, in the acceleration detection substrate 10, only the mounting frame 15 abuts the damping member 20 to form a gap G between portions excluding the mounting frame 15 (the weight 11, the supporter 12, the intermediate fixing portion 13, and the connection portion 14) and the damping member 20. Also, although details will be described later, the gap G formed between the weight 11 and the damping member 20 acts as a damper with respect to the weight 11.

The acceleration detecting resonator R1 is provided to detect acceleration (acceleration in the Z direction) acting on the resonant sensor device 1 and is designed such that the resonance frequency is changed when strain generated in the spring portion 12a is applied thereto. The acceleration detecting resonator R1 has a longitudinal direction along the X direction and is disposed at a position where the applied strain becomes as large as possible. Further, when strain is generated in the spring portion 12a, it is desirable that the acceleration detecting resonator R1 be disposed at a position where the applied strain is a maximum, but at least a part of the acceleration detecting resonator R1 may be embedded in the spring portion 12a. For this reason, a part of the acceleration detecting resonator R1 may be embedded in the weight 11 or the intermediate fixing portion 13.

For example, a tensile stress may be applied to the acceleration detecting resonator R1 in advance in the X direction, and the acceleration detecting resonator R1 may be designed to vibrate in the Y direction (third direction). The reason why the tensile stress in the X direction is applied to the acceleration detecting resonator R1 is to widen a dynamic range for an input acceleration (negative input acceleration) that causes compressive strain in the acceleration detecting resonator R1. That is, by applying the tensile stress to the acceleration detecting resonator R1 to make it difficult to buckle, the dynamic range for negative input acceleration can be expanded.

In addition, the tensile stress in the X direction acting on the acceleration detecting resonator R1 is applied, for example, by diffusing impurities having atomic radii smaller than a radius of the material constituting the acceleration detecting resonator R1 into the acceleration detecting resonator R1. For example, when the acceleration detecting resonator R1 is made of silicon, the tensile stress is applied by diffusion of impurities such as boron (B) and phosphorus (P).

Also, the reason why the acceleration detecting resonator R1 is vibrated in the Y direction is to prevent deterioration in measurement accuracy of acceleration even when the resonance frequency of the acceleration detecting resonator R1 and a resonance frequency (including a higher-order mode) of the spring portion 12a coincide with each other. That is, by setting a vibrating direction of the acceleration detecting resonator R1 to the Y direction orthogonal to the Z direction that is a vibrating direction of the spring portion 12a, energy for vibrating the acceleration detecting resonator R1 is prevented from being absorbed by the spring portion 12a, thereby preventing deterioration in measurement accuracy of acceleration.

The acceleration detecting resonator R1 is formed integrally with the weight 11, the spring portion 12a, the intermediate fixing portion 13, the connection portion 14, and the mounting frame 15 by processing a silicon substrate. Thus, in addition to the weight 11, the spring portion 12a, the intermediate fixing portion 13, the connection portion 14, and the mounting frame 15, the acceleration detecting resonator R1 is integrally formed without using an adhesive or the like, whereby temperature characteristics, hysteresis, long-term stability, etc., can be improved. In addition, the acceleration detecting resonator R1 is vacuum-sealed. Moreover, a specific configuration of the acceleration detecting resonator R1 will be described later.

The temperature detecting resonator R2 is provided for measuring an internal temperature (a temperature substantially equal to the temperature of the acceleration detecting resonator R1) of the resonant sensor device 1 and is embedded in the mounting frame 15. Also, the temperature detecting resonator R2 may not only be disposed in the mounting frame 15, but can also be disposed in the weight 11, the supporter 12, the intermediate fixing portion 13, or the connection portion 14. By disposing the temperature detecting resonator R2 in the weight 11, the intermediate fixing portion 13, or the connection portion 14, it is possible to make it less susceptible to strain caused by thermal stress, stress due to an external force, or the like. Further, when the temperature detecting resonator R2 is disposed in the intermediate fixing portion 13 or the connection portion 14, it is possible to make it less susceptible to acceleration. The detection result of the temperature detecting resonator R2 is used to correct the temperature effect on the detection result (resonance frequency) of the acceleration detecting resonator R1. Moreover, a specific configuration of the temperature detecting resonator R2 will be described later.

The aluminum pad PD1 is an electrode electrically connected to the acceleration detecting resonator R1, and is formed on the mounting frame 15 corresponding to the acceleration detecting resonator R1. An excitation signal for vibrating the acceleration detecting resonator R1 is supplied from the outside to the aluminum pad PD1, and a detection signal (a signal having the same frequency as the resonance frequency of the acceleration detecting resonator R1) is output from the acceleration detecting resonator R1 to the aluminum pad PD1.

The aluminum pad PD2 is an electrode electrically connected to the temperature detecting resonator R2 and is formed on the mounting frame 15 corresponding to the temperature detecting resonator R2. An excitation signal for vibrating the temperature detecting resonator R2 is supplied from the outside to the aluminum pad PD2, and a detection signal (a signal having a frequency corresponding to the temperature) is output from the temperature detecting resonator R2 to the aluminum pad PD2.

The aluminum pad PD0 is an electrode (an aluminum pad for a shield) provided to prevent an influence of noise, is electrically connected at a portion not electrically connected to the acceleration detecting resonator R1 and the temperature detecting resonator R2, and is connected to, for example, a ground potential. Also, the shield is not necessarily provided, and in this case, the aluminum pad PD0 is not provided.

The damping member 20 is a member provided for controlling vibrational characteristics of the weight 11 and is disposed close to the weight 11 with the predetermined gap G therebetween. Specifically, the damping member 20 is formed using a material (for example, silicon or glass) having a thermal expansion coefficient, an elastic constant, or the like that is similar to those of the acceleration detection substrate 10 and is joined to the mounting frame 15 on a −Z side of the acceleration detection substrate 10 so that the gap G is formed between the damping member 20 and the weight 11.

The damping member 20 is disposed close to the weight 11 with the gap G therebetween, and thus the gap G acts as a damper with respect to the weight 11 due to a squeeze film effect. The effect of this damper can be regulated by adjusting a size of the gap G and a pressure of gas in the gap G. For this reason, since a damping coefficient of the weight 11 can be adjusted when the size of the gap G and the pressure of the gas in the gap G are adjusted, vibrational characteristics of the weight 11 can be set to desired characteristics. Also, in many cases, the vibration characteristics of the weight 11 are adjusted to be Butterworth characteristics (the flattest characteristics). Further, the pressure of the gas in the gap G is set to a pressure different from a sealing pressure of the acceleration detecting resonator R1 that is vacuum-sealed.

As described above, since the damping member 20 is formed using a material having a thermal expansion coefficient, an elastic constant, or the like that is similar to those of the acceleration detection substrate 10 and is directly bonded to the mounting frame 15 of the acceleration detection substrate 10, temperature characteristics, hysteresis, long-term stability, etc., can be improved.

The package 30 is a member that protects the acceleration detection substrate 10 and the damping member 20 and accommodates the acceleration detection substrate 10 and the damping member 20 in an accommodating portion 33 surrounded by a bottom portion 31 and a peripheral wall 32.

The package 30 has the bottom portion 31 bonded to the damping member 20 from the −Z side via an adhesive layer S. Such a package 30 is made of, for example, ceramics such as aluminum oxide or metals such as Kovar. Also, as the material for forming the adhesive layer S, a conductive or insulating adhesive, low melting point glass, solder, or the like can be used.

Also, the package 30 includes electrodes D0 to D2 that are electrically connected to the aluminum pads PD0 to PD2 of the acceleration detection substrate 10 via wires W. These electrodes D0 to D2 are provided on an end face of the peripheral wall 32 on the +Z side. The electrode D0 is connected to the aluminum pad PD0, the electrode D1 is connected to the aluminum pad PD1, and the electrode D2 is connected to the aluminum pad PD2. Further, the package 30 includes a plurality of terminal portions (not shown) that are electrically connected to the electrodes D0 to D2 and are connected to an external device.

The package 30 functions as a base that supports the acceleration detection substrate 10 together with the damping member 20. That is, in the present embodiment, the base is configured to include the damping member 20 and the package 30, and the acceleration detection substrate 10 is supported by fixing a part of the acceleration detection substrate 10 to the base. Also, it is possible to adopt a configuration that does not include the damping member 20 or the package 30. For example, when the damping member 20 is not provided, only the package 30 functions as the base, and when the package 30 is not provided, only the damping member 20 functions as the base.

<Acceleration Detecting Resonator>

Figure 2:
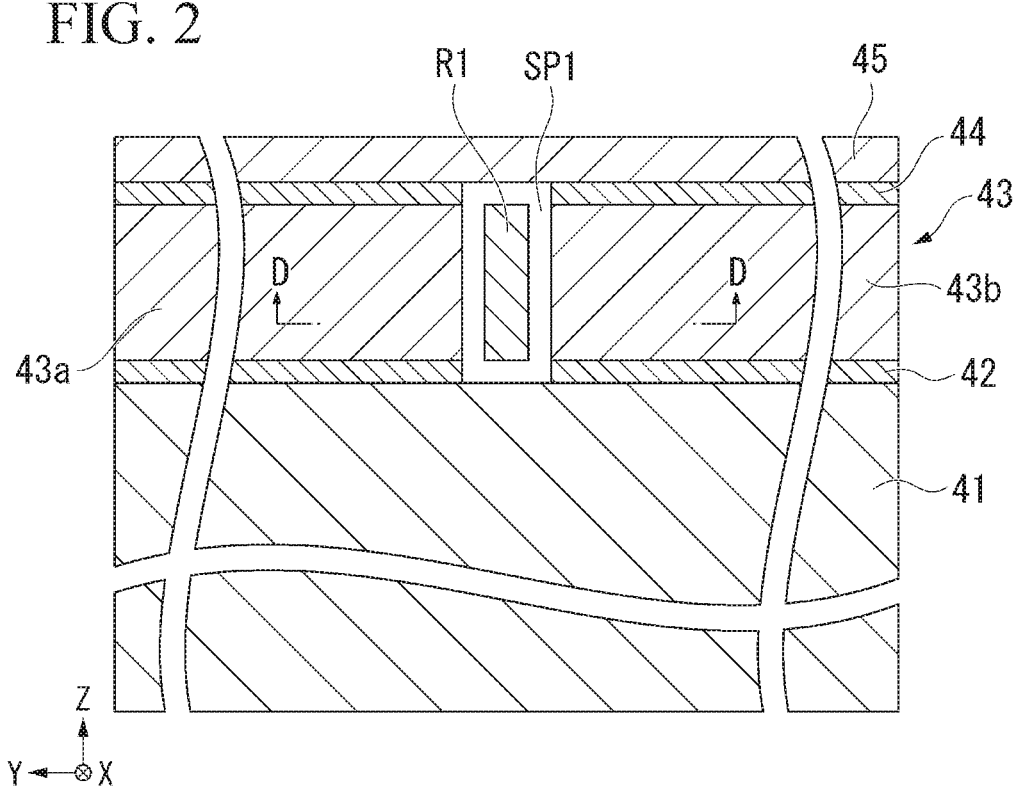
FIG. 2 is a cross-sectional view taken along line B-B of FIG. 1.
Figure 3:
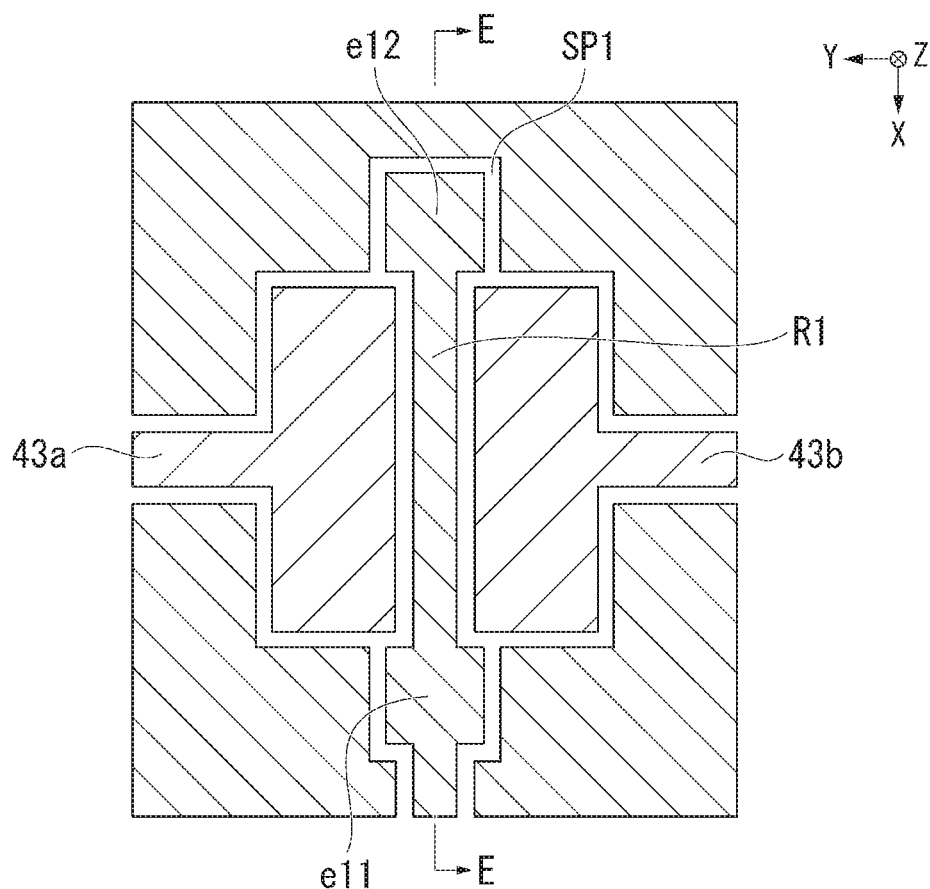
FIG. 3 is a cross-sectional view taken along line D-D of FIG. 2.
Figure 4:
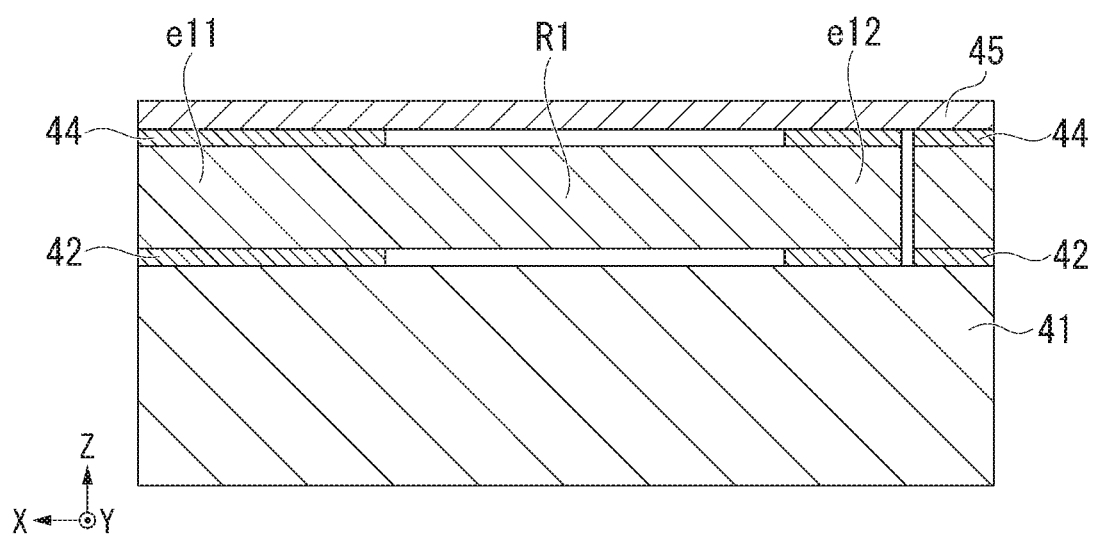
FIG. 4 is a cross-sectional view taken along line E-E of FIG. 3.

FIGS. 2 to 4 are cross-sectional views of the acceleration detecting resonator provided in the resonant sensor device 1 according to the first embodiment of the present invention. Specifically, FIG. 2 is a cross-sectional view taken along line B-B of FIG. 1A, FIG. 3 is a cross-sectional view taken along line D-D of FIG. 2, and FIG. 4 is a cross-sectional view taken along line E-E of FIG. 3.

As shown in FIG. 2, the portion where the acceleration detecting resonator R1 is embedded has a structure in which a lower insulating film 42, an electrode 43 (an input electrode 43a and an output electrode 43b), an upper insulating film 44, and a shell 45 are formed on a substrate 41 in this order. In addition, the portion where the acceleration detecting resonator R1 is embedded is a portion on a front surface side (+Z side) of the portion where the spring portion 12a is connected to the intermediate fixing portion 13. The acceleration detecting resonator R1 is disposed in a vacuum chamber SP1 formed by the substrate 41, the input electrode 43a, the output electrode 43b, the shell 45, and the like.

The substrate 41 is, for example, a silicon substrate. The lower insulating film 42 and the upper insulating film 44 are, for example, silicon oxide films, and are formed to electrically insulate the input electrode 43a and the output electrode 43b. The shell 45 is made of, for example, polysilicon, and is provided for sealing the vacuum chamber SP1 in which the acceleration detecting resonator R1 is disposed.

The input electrode 43a is an electrode to which the excitation signal for vibrating the acceleration detecting resonator R1 is input, and the output electrode 43b is an electrode for extracting the signal having the same frequency as the resonance frequency of the acceleration detecting resonator R1. These input electrode 43a and output electrode 43b are disposed to sandwich the acceleration detecting resonator R1 in the Y direction.

The acceleration detecting resonator R1 is a beam-shaped member formed to extend in the X direction, as shown in FIG. 3, and both ends e11 and e12 thereof are fixed to the substrate 41 and the shell 45 via the lower insulating film 42 and the upper insulating film 44 as shown in FIG. 4. That is, the acceleration detecting resonator R1 is disposed in the vacuum chamber SP1 formed at least partially inside the spring portion 12a in a state where both ends e11 and e12 are fixed with the tensile stress being applied thereto. For this reason, if the spring portion 12a bends in the Z direction, strain (tensile strain and compression strain) is applied to the acceleration detecting resonator R1. In addition, the resonance frequency of the acceleration detecting resonator R1 increases when tensile strain is applied, and decreases when compressive strain is applied.

<Temperature Detecting Resonator>

Figure 5:
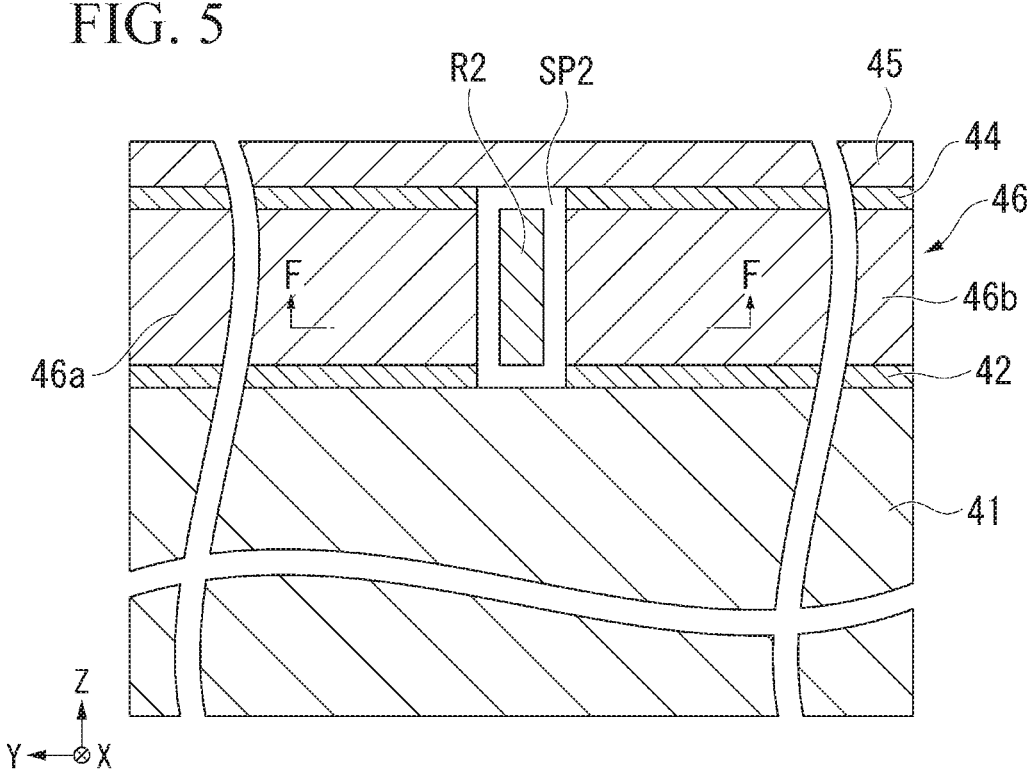
FIG. 5 is a cross-sectional view taken along line C-C of FIG. 1.
Figure 6:
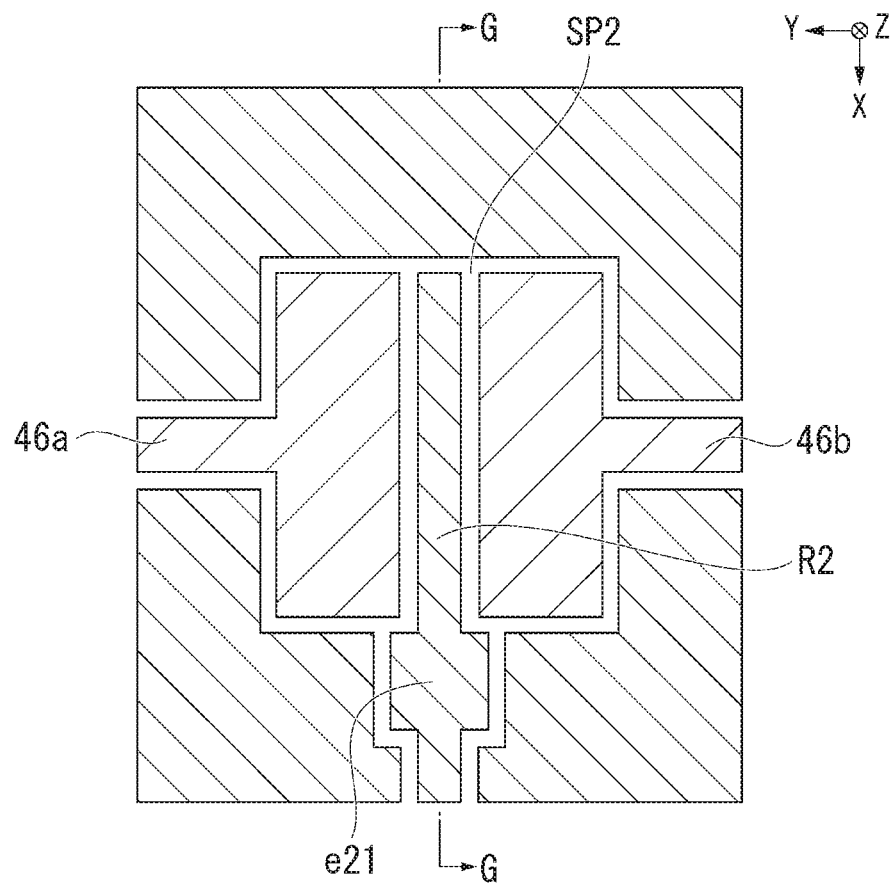
FIG. 6 is a cross-sectional view taken along line F-F of FIG. 5.
Figure 7:
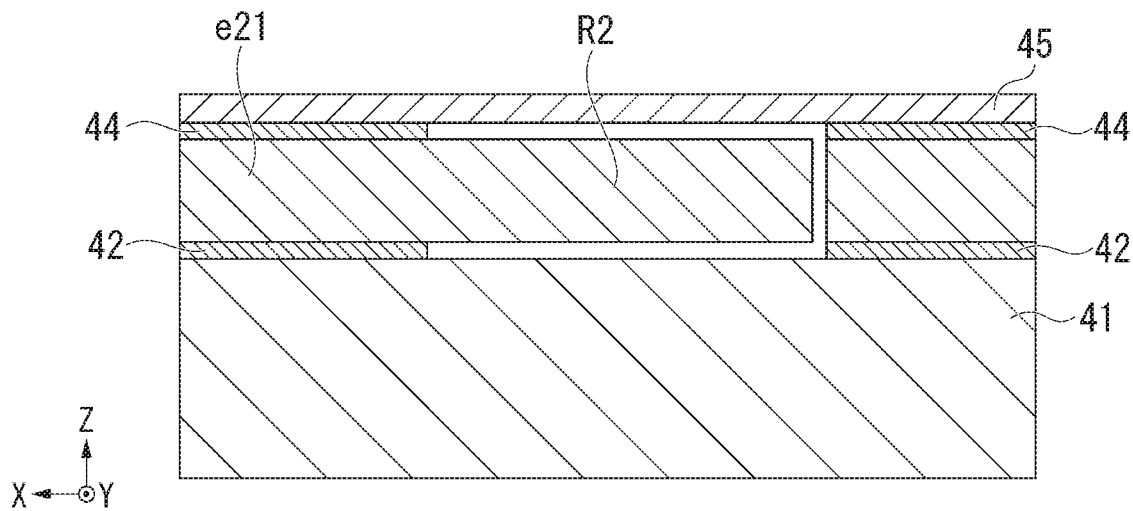
FIG. 7 is a cross-sectional view taken along line G-G of FIG. 6.

FIGS. 5 to 7 are cross-sectional views of the temperature detecting resonator provided in the resonant sensor device 1 according to the first embodiment of the present invention. Specifically, FIG. 5 is a cross-sectional view taken along line C-C in FIG. 1A, FIG. 6 is a cross-sectional view taken along line F-F in FIG. 5, and FIG. 7 is a cross-sectional view taken along line G-G in FIG. 6.

As shown in FIG. 5, the portion where the temperature detecting resonator R2 is embedded has the same structure as the portion where the acceleration detecting resonator R1 is embedded. That is, the portion is provided with an electrode 46 (an input electrode 46a and an output electrode 46b) instead of the electrode 43 (the input electrode 43a and the output electrode 43b), and has a structure in which the lower insulating film 42, the electrode 46 (the input electrode 46a and the output electrode 46b), the upper insulating film 44, and the shell 45 are formed on the substrate 41 in this order. The temperature detecting resonator R2 is disposed in a vacuum chamber SP2 formed by the substrate 41, the input electrode 46a, the output electrode 46b, the shell 45, and the like.

The input electrode 46a is an electrode to which the excitation signal for vibrating the temperature detecting resonator R2 is input, and the output electrode 46b is an electrode for extracting the signal having the same frequency as the resonance frequency of the temperature detecting resonator R2. Similar to the input electrode 43a and the output electrode 43b, the input electrode 46a and the output electrode 46b are disposed to sandwich the temperature detecting resonator R2 in the Y direction. Also, a dispositional direction of the temperature detecting resonator R2 may be directed in another direction.

The temperature detecting resonator R2 is a beam-shaped member formed to extend in the X direction as shown in FIG. 6, and one end e21 thereof is fixed to the substrate 41 and the shell 45 via the lower insulating film 42 and the upper insulating film 44 as shown in FIG. 7. That is, the temperature detecting resonator R2 is disposed in the vacuum chamber SP2 with only one end e21 fixed so as not to be affected by the strain generated due to the mounting and the acceleration acting on the resonant sensor device 1. In addition, in the present embodiment, although the temperature detecting resonator R2 is in a cantilevered beam state in which only one end e21 thereof is fixed, both ends of the temperature detecting resonator R2 can also be fixed. For example, when the temperature detecting resonator R2 is embedded in the intermediate fixing portion 13 or the weight 11, the influence of the strain generated by the mounting and the acceleration acting on the resonant sensor device 1 on the temperature detecting resonator R2 can be reduced. For this reason, for example, when the temperature detecting resonator R2 is embedded in the intermediate fixing portion 13 or the weight 11, both ends of the temperature detecting resonator R2 may be in a doubly supported beam state.

In such a temperature detecting resonator R2, a Young's modulus changes in accordance with an internal temperature of the resonant sensor device 1 (a temperature substantially equal to the temperature of the acceleration detecting resonator R1) and thus the resonance frequency changes. For this reason, the internal temperature of the resonant sensor device 1 can be obtained from a frequency of a signal extracted from the output electrode 46b. In addition, the obtained internal temperature of the resonant sensor device 1 is used for performing a temperature correction of the detection result (resonance frequency) of the acceleration detecting resonator R1.

<Operations of Resonant Sensor Device>

Next, operations of the resonant sensor device 1 described above will be briefly described. When acceleration in the Z direction acts on the resonant sensor device 1, the weight 11 is relatively displaced with respect to the intermediate fixing portion 13 in the +Z direction or the −Z direction. Then, the spring portion 12a bends in accordance with an amount of the relative displacement between the weight 11 and the intermediate fixing portion 13, and strain proportional to the acceleration acting on the resonant sensor device 1 is generated. The strain generated in the spring portion 12a is applied to the acceleration detecting resonator R1, thereby changing the resonance frequency of the acceleration detecting resonator R1.

Specifically, when an acceleration (a positive input acceleration) that relatively displaces the weight 11 in the −Z direction acts on the resonant sensor device 1, the spring portion 12a bends in the −Z direction due to the displacement of the weight 11, and tensile strain is generated on an upper surface (a surface on the +Z side) of the spring portion 12a. When such strain is applied to the acceleration detecting resonator R1, the resonance frequency of the acceleration detecting resonator R1 increases.

On the other hand, when an acceleration (a negative input acceleration) that relatively displaces the weight 11 in the +Z direction acts on the resonant sensor device 1, the spring portion 12a bends in the +Z direction due to the displacement of the weight 11, and compressive strain is generated on the upper surface (the surface on the +Z side) of the spring portion 12a. When such strain is applied to the acceleration detecting resonator R1, the resonance frequency of the acceleration detecting resonator R1 decreases. By detecting such a change in resonance frequency of the acceleration detecting resonator R1, the acceleration acting on the resonant sensor device 1 is measured.

In the resonant sensor device 1 of the present embodiment described above, the connection portion 14, the intermediate fixing portion 13, the supporter 12, and the weight 11 are disposed in a state of being separated from the damping member 20, and only the connection portion 14 of these portions is directly connected to the mounting frame 15 fixed to the damping member 20. For this reason, strain caused by thermal stress, stress due to an external force, or the like is input to the supporter 12 only through the connection portion 14.

Specifically, when the resonant sensor device 1 of the present embodiment is exposed to a temperature different from a predetermined reference temperature, thermal stress is generated at a boundary portion between the mounting frame 15 and the damping member 20 due to a difference in linear expansion coefficient between the acceleration detection substrate 10 and the damping member 20. Similarly, thermal stress is also generated at a boundary portion between the damping member 20 and the package 30. Similarly, thermal stress is also generated at a boundary between the aluminum pads PD0 to PD2 and the mounting frame 15. Due to these thermal stresses, strain occurs in the mounting frame 15, the damping member 20, and the package 30 of the acceleration detection substrate 10. Further, even when the thermal stress is relieved because the aluminum pads PD0 to PD2 are plastically deformed by the thermal stress, strain is generated in the mounting frame 15 of the acceleration detection substrate 10. Further, when an external force is applied to the package 30, a stress due to an external force is generated, and thus strain is generated in the mounting frame 15 and the damping member 20 due to the stress. Since the connection portion 14, the intermediate fixing portion 13, the supporter 12, and the weight 11 are disposed in a state of being separated from the damping member 20, such strain is not input to the supporter 12 from the Z direction, but is input to the supporter 12 only from the X direction through the connection portion 14.

Here, in the resonant sensor device 1 of the present embodiment, the maximum dimension d1 of the connection portion 14 in the Y direction orthogonal to the direction (X direction) connected to the mounting frame 15 is smaller than the maximum dimension d2 of the supporter 12 in the same direction. For this reason, a width of a strain transmission path is reduced as compared to a case where the mounting portion and the weight 11 are directly connected by the supporter 12. Therefore, it is possible to prevent the strain caused by thermal stress, stress due to an external force, or the like from being transmitted to the spring portion 12a in which the acceleration detecting resonator R1 is embedded.

In addition, for example, in a case in which the mounting portion is directly connected to the weight 11 with the spring portion 12a, strain caused by thermal stress, stress due to an external force, or the like can be inhibited from being transmitted to the spring portion 12a as the width dimension (dimension in the third direction) of the spring portion 12a is reduced. However, since rigidity of the spring portion 12a reduces as the width dimension of the spring portion 12a becomes smaller, movements of the weight 11 in directions other than a sensitivity axis direction cannot be inhibited, whereby the weight 11 performs a swinging motion in the intersecting plane (XY plane) intersecting the sensitivity axis direction. Such a swinging motion of the weight 11 in the intersecting plane causes measurement errors.

On the other hand, according to the resonant sensor device 1 of the present embodiment, the maximum dimension d1 of the connection portion 14 in the Y direction orthogonal to the direction (X direction) connected to the mounting frame 15 is smaller than the maximum dimension d2 of the supporter 12 in the same direction. That is, the maximum dimension d2 of the supporter 12 in the Y direction is wider than the maximum dimension d1 of the connection portion 14 in the same direction. For this reason, movements of the weight 11 in the Y direction and the X direction, that is, movements of the weight 11 in the intersecting plane can be inhibited as compared to a case where the maximum dimension d2 of the supporter 12 in the Y direction is equal to or less than the maximum dimension d1 of the connection portion 14 in the same direction. That is, according to the resonant sensor device 1 of the present embodiment, movement of the weight 11 is allowed only in the Z direction and the swinging motion of the weight 11 in the intersecting plane intersecting the Z direction can be inhibited. Therefore, according to the resonant sensor device 1 of the present embodiment, by configuring the weight 11 to be movable only in the Z direction that becomes the sensitivity axis for acceleration, measurement errors due to the swinging motion of the weight 11 can be reduced, thereby providing the maximum measurement performance of the acceleration detecting resonator R1.

Second Embodiment

Figure 8A:
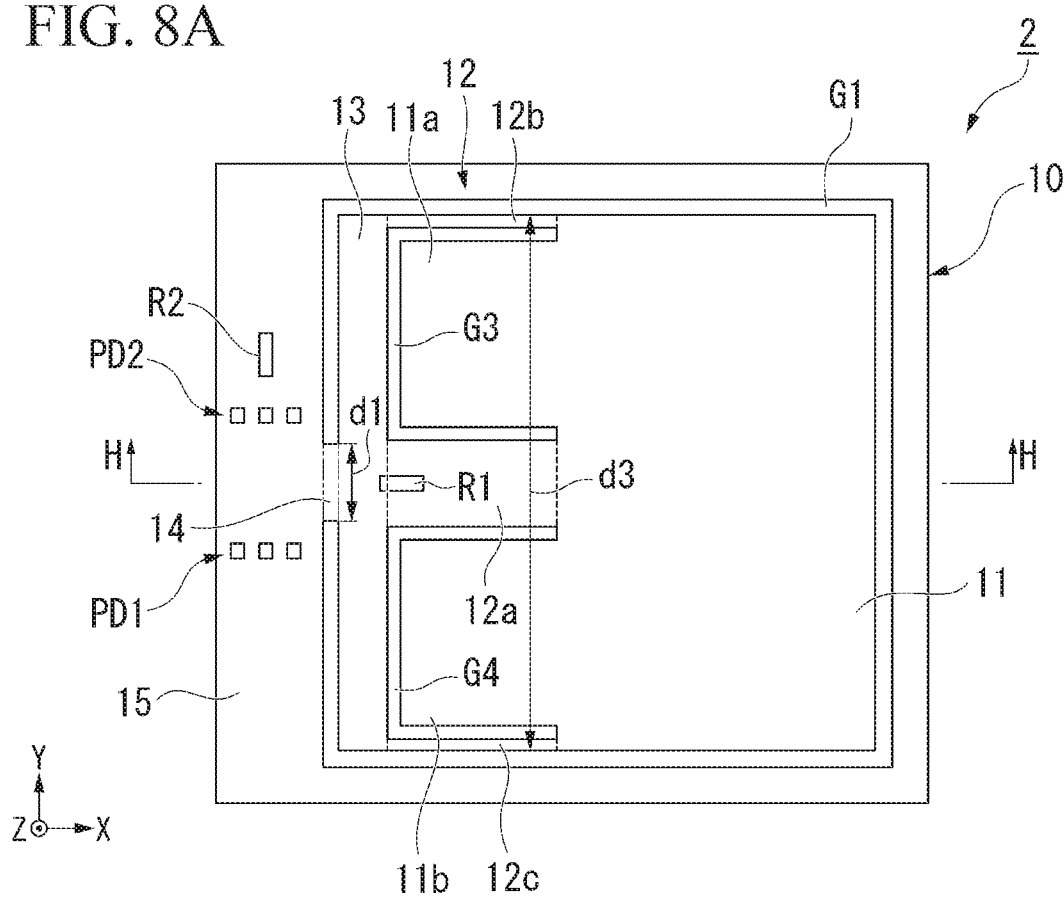
FIG. 8A is a diagram showing a resonant sensor device according to a second embodiment of the present invention.
Figure 8B:
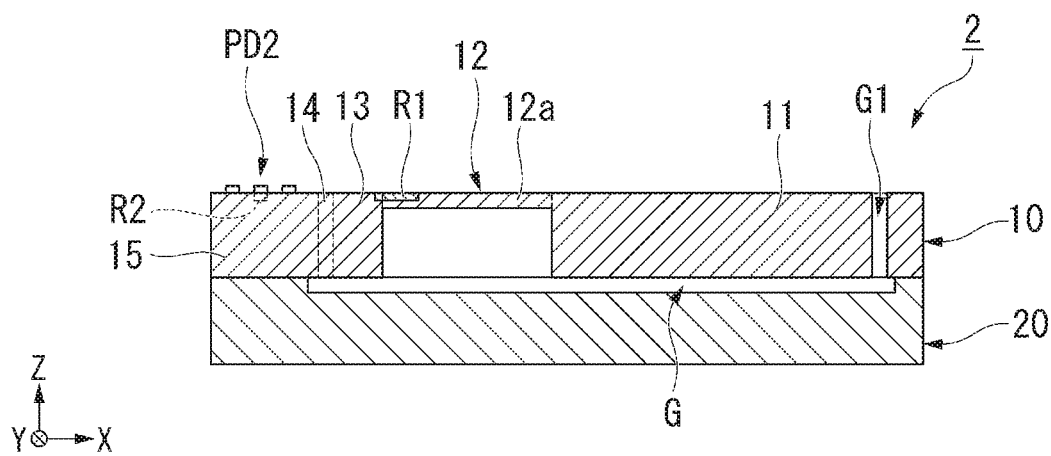
FIG. 8B is a diagram showing a resonant sensor device according to a second embodiment of the present invention.

FIG. 8A and FIG. 8B are diagrams showing a resonant sensor device according to a second embodiment of the present invention. FIG. 8A is a plan view, and FIG. 8B is a cross-sectional view taken along line H-H in FIG. 8A. Also, in FIG. 8A and FIG. 8B, components corresponding to those shown in FIG. 1A and FIG. 1B are denoted by the same reference signs. Further, FIG. 8A and FIG. 8B are shown with the package 30 in the first embodiment omitted. As shown in FIG. 8A and FIG. 8B, in a resonant sensor device 2 of the present embodiment, the supporter 12 of the first embodiment has a first hanging portion 12b (a supporting portion) and a second hanging portion 12c (a supporting portion) in addition to the spring portion 12a. That is, in the present embodiment, the supporter 12 is configured by including the spring portion 12a, the first hanging portion 12b, and the second hanging portion 12c.

The first hanging portion 12b extends in the X direction while one end portion (an end portion in the +X direction) thereof is connected to the weight 11 and the remaining end portion (an end portion in the −X direction) thereof is connected to the intermediate fixing portion 13, and is disposed to be spaced apart from the spring portion 12a in the +Y direction. The second hanging portion 12c extends in the X direction while one end portion (an end portion in the +X direction) thereof is connected to the weight 11 and the remaining end portion (an end portion in the −X direction) thereof is connected to the intermediate fixing portion 13, and is disposed to be spaced apart from the spring portion 12a in the −Y direction. The first hanging portion 12b and the second hanging portion 12c have the same thickness dimension (dimension in the Z direction) as that of the spring portion 12a and are disposed to be spaced apart from the damping member 20 in the Z direction. Further, since the first hanging portion 12b and the second hanging portion 12c do not incorporate the acceleration detecting resonator R1, their width dimensions in the Y direction are smaller than that of the spring portion 12a.

In such a supporter 12, the first hanging portion 12b is disposed on the most+Y side and the second hanging portion 12c is disposed on the most −Y side in the Y direction. For this reason, as shown in FIG. 8A, a maximum dimension d3 of the supporter 12 in the Y direction becomes a separation dimension from a +Y side end portion of the first hanging portion 12b to a −Y side end portion of the second hanging portion 12c. The maximum dimension d3 of the supporter 12 in the Y direction (a direction orthogonal to a direction of the connection portion 14 connected to the mounting frame 15) is wider than the maximum dimension d1 of the connection portion 14 in the Y direction. For this reason, the movements of the weight 11 in the Y direction and the X direction, that is, the movements of the weight 11 in the intersecting plane intersecting the Z direction can be inhibited as compared to a case where the maximum dimension d3 of the supporter 12 in the Y direction is equal to or less than the maximum dimension d1 of the connection portion 14 in the same direction. That is, according to the resonant sensor device 2 of the present embodiment, like the resonant sensor device 1, by allowing the movement of the weight 11 only in the Z direction, the swinging motion of the weight 11 in the intersecting plane intersecting the Z direction can be inhibited. Therefore, according to the resonant sensor device 1 of the present embodiment, by making the weight 11 to be movable only in the Z direction that is the sensitivity axis for acceleration, measurement errors resulting from the swinging motion of the weight 11 can be reduced, thereby providing the maximum measurement performance of the acceleration detecting resonator R1.

In addition, also in the resonant sensor device 2 of the present embodiment, similarly to the resonant sensor device 1 of the first embodiment, the connection portion 14, the intermediate fixing portion 13, the supporter 12, and the weight 11 are disposed in a state of being separated from the damping member 20, and only the connection portion 14 of these portions is directly connected to the mounting frame 15 fixed to the damping member 20. For this reason, strain caused by thermal stress, stress due to an external force, or the like is input to the supporter 12 only through the connection portion 14.

Further, since the maximum dimension d1 of the connection portion 14 in the Y direction orthogonal to the direction (X direction) connected to the mounting frame 15 is smaller than the maximum dimension d3 of the supporter 12 in the same direction, strain caused by thermal stress, stress due to an external force, or the like can be prevented from being transmitted to the spring portion 12a in which the acceleration detecting resonator R1 is embedded.

Further, in the resonant sensor device 2 of the present embodiment, as shown in FIG. 8A, the weight 11 has a first protruding portion 11a accommodated between the spring portion 12a and the first hanging portion 12b, and a second protruding portion 11b accommodated between the spring portion 12a and the second hanging portion 12c. The first protruding portion 11a is disposed to have a gap G3 with respect to the spring portion 12a, the first hanging portion 12b, and the intermediate fixing portion 13. Also, the second protruding portion 11b is disposed to have a gap G4 with respect to the spring portion 12a, the second hanging portion 12c, and the intermediate fixing portion 13. The weight 11 can be moved in the Z direction by being disposed to have these gap G3 and gap G4.

As described above, a mass of the weight 11 can be increased by providing the first protruding portion 11a and the second protruding portion 11b as compared to a case where the first protruding portion 11a and the second protruding portion 11b are not provided. For this reason, since an inertial mass of the weight 11 increases, it is possible to increase an amount of deflection of the spring portion 12a when the acceleration is applied to the resonant sensor device 2 in the Z direction.

Further, as shown in FIG. 8A, dispositional positions of the aluminum pads PD1 and PD2 and the temperature detecting resonator R2 in the resonant sensor device 2 of the present embodiment are on the mounting frame 15, but are changed as compared to the resonant sensor device 1 of the first embodiment. In this way, the dispositional positions of the aluminum pads PD1 and PD2 and the temperature detecting resonator R2 are arbitrarily changeable. In addition, the resonant sensor device 2 of the present embodiment does not include the aluminum pad PD0. In this way, it is also possible to employ a configuration in which the aluminum pad PD0 is omitted without including a shield.

Figure 9:
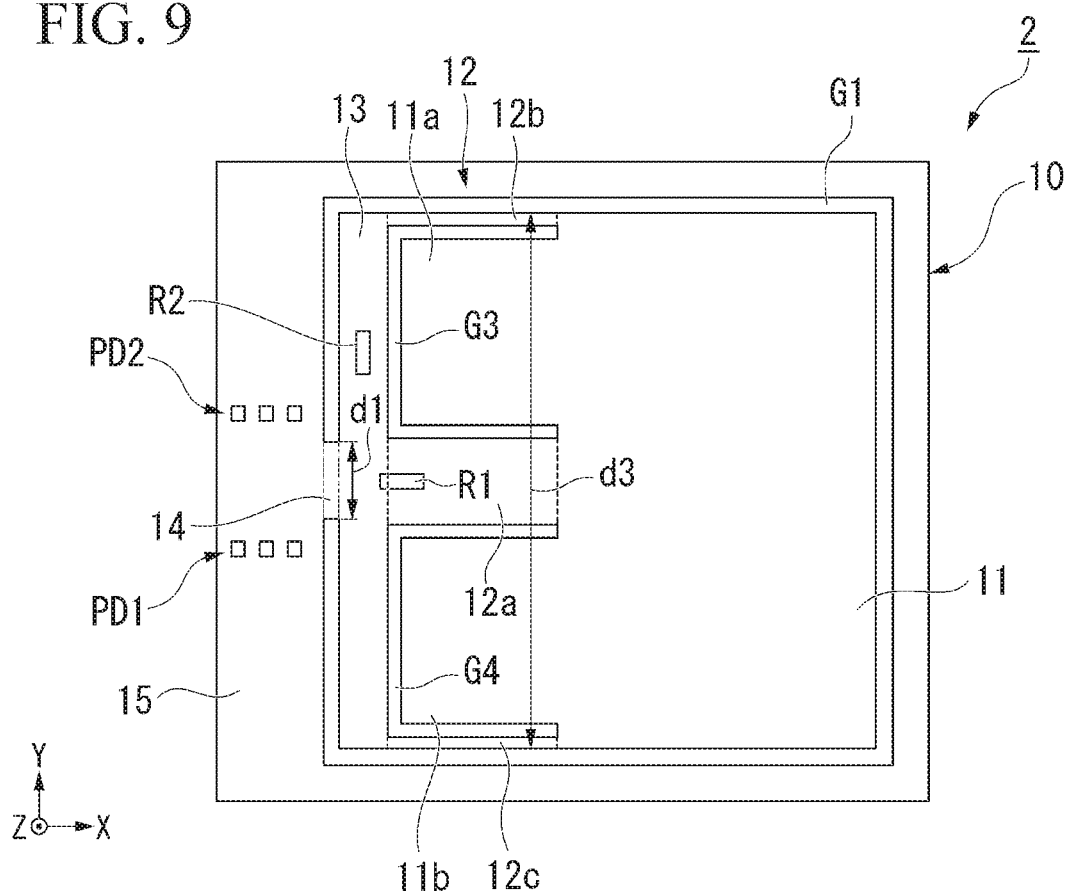
FIG. 9 is a plan view showing a modified example of the resonant sensor device according to the second embodiment of the present invention.

FIG. 9 is a plan view showing a modified example of the resonant sensor device 2 of the second embodiment. As shown in this figure, the dispositional position of the temperature detecting resonator R2 can be changed to the intermediate fixing portion 13. Since the intermediate fixing portion 13 is connected to the mounting frame 15 via the connection portion 14 and is disposed to be spaced apart from the damping member 20 in the Z direction, it is less susceptible to strain caused by thermal stress, stress due to an external force, or the like. Further, the intermediate fixing portion 13 is less susceptible to acceleration than the weight 11. For this reason, by changing the dispositional position of the temperature detecting resonator R2 to the intermediate fixing portion 13, it is possible to reduce an influence of the strain caused by thermal stress on the temperature detecting resonator R2, stress due to an external force, or the like while inhibiting the influence of the acceleration on the temperature detecting resonator R2.

Third Embodiment

Figure 10A:
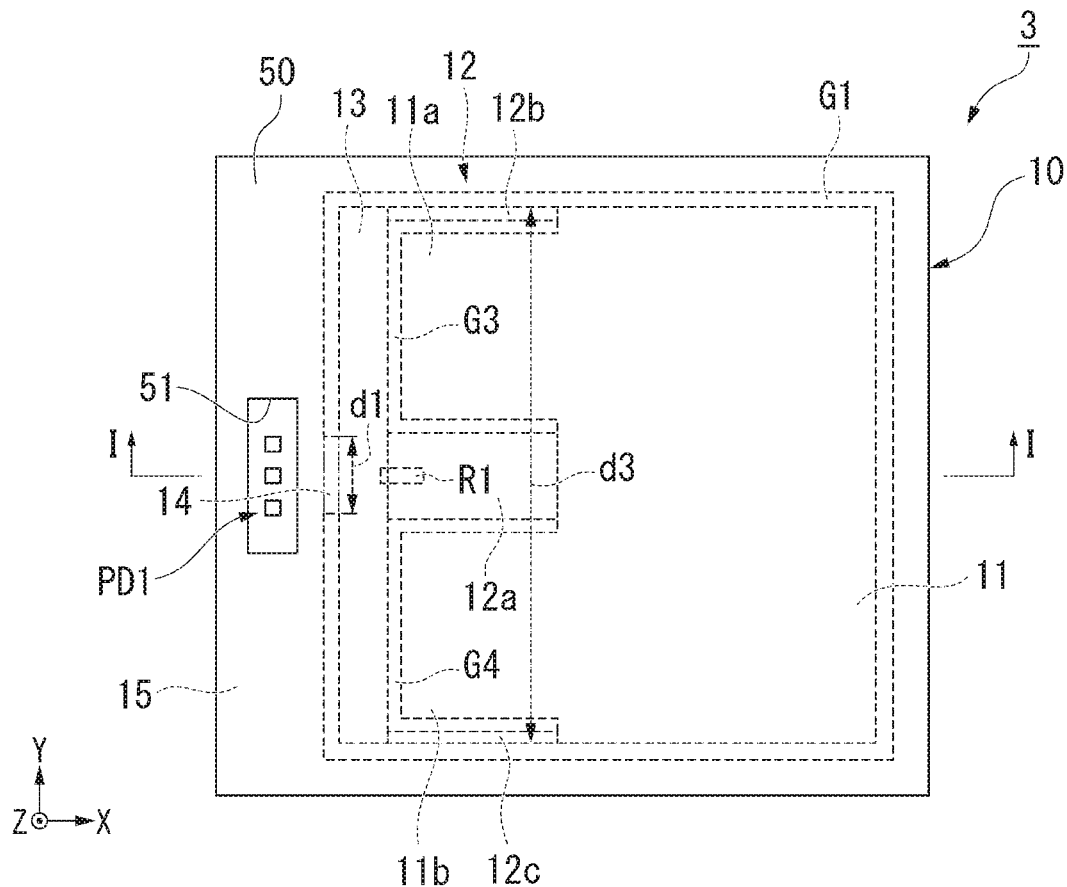
FIG. 10A is a diagram showing a resonant sensor device according to a third embodiment of the present invention.
Figure 10B:
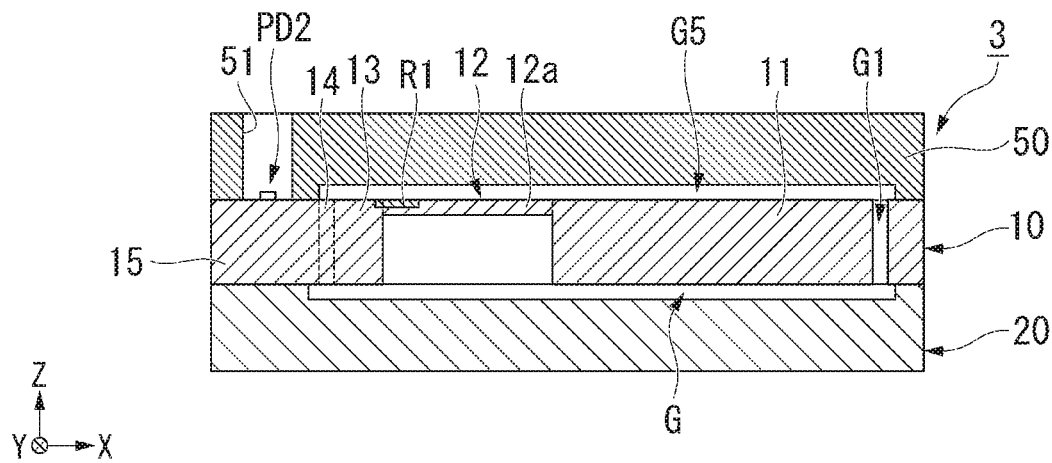
FIG. 10B is a diagram showing a resonant sensor device according to a third embodiment of the present invention.

FIG. 10A and FIG. 10B are diagrams showing a resonant sensor device according to a third embodiment of the present invention. FIG. 10A is a plan view, and FIG. 10B is a cross-sectional view taken along line I-I in FIG. 10A. Also, in FIG. 10A and FIG. 10B, components corresponding to those shown in FIG. 8A and FIG. 8B are denoted by the same reference signs. Further, FIG. 10A and FIG. 10B are shown with the package 30 in the first embodiment omitted. As shown in FIG. 10A and FIG. 10B, a resonant sensor device 3 of the present embodiment is a device in which a covering member 50 (sealing portion) is provided on the resonant sensor device 2 shown in FIG. 8A and FIG. 8B to seal the weight 11, the supporter 12, the acceleration detecting resonator R1, and the like.

Similarly to the damping member 20, the covering member 50 is formed using a material (for example, silicon or glass) having a thermal expansion coefficient, an elastic constant, and the like that are similar to those of the acceleration detection substrate 10. The covering member 50 is bonded to the mounting frame 15 on the +Z side of the acceleration detection substrate 10. A bottom surface of the covering member 50 is etched so that the weight 11 which is movable in the Z direction and the spring portion 12a which is bent in the Z direction due to displacement of the weight 11 do not come into contact therewith.

Further, a through hole 51 is formed in the covering member 50. The through hole 51 is formed from a front surface side to a back surface side of the covering member 50 at a position corresponding to a position (a position in a plan view) where the aluminum pad PD1 is formed. In addition, a metal layer connected to the aluminum pad PD1 may be provided on an inner wall of the through hole 51, and an external electrode connected to the metal layer may be formed on a front surface side of the covering member 50.

The covering member 50 forms a gap G5 on a side opposite to the damping member 20 with respect to the weight 11. The gap G5 communicates with the gap G through the gap G1 and the like. In addition, the covering member 50 seals the gap G5 and also seals the gap G communicated with the gap G5 as a result. Since the covering member 50 is disposed close to the weight 11 with the gap G5 therebetween, the gap G5 acts as a damper with respect to the weight 11 due to a squeeze film effect. Therefore, in the resonant sensor device 3 of the present embodiment, spaces acting as dampers are formed on both sides of the weight 11 in the Z direction, and thus damping effects of the weight 11 can be further enhanced.

Also, in the resonant sensor device 3 of the present embodiment, since the gap G and the gap G5 are sealed, a pressure of the gas in the gap G and the gap G5 can be easily adjusted, and thus vibrational characteristics of the weight 11 can be easily set to desired characteristics.

Figure 11A:
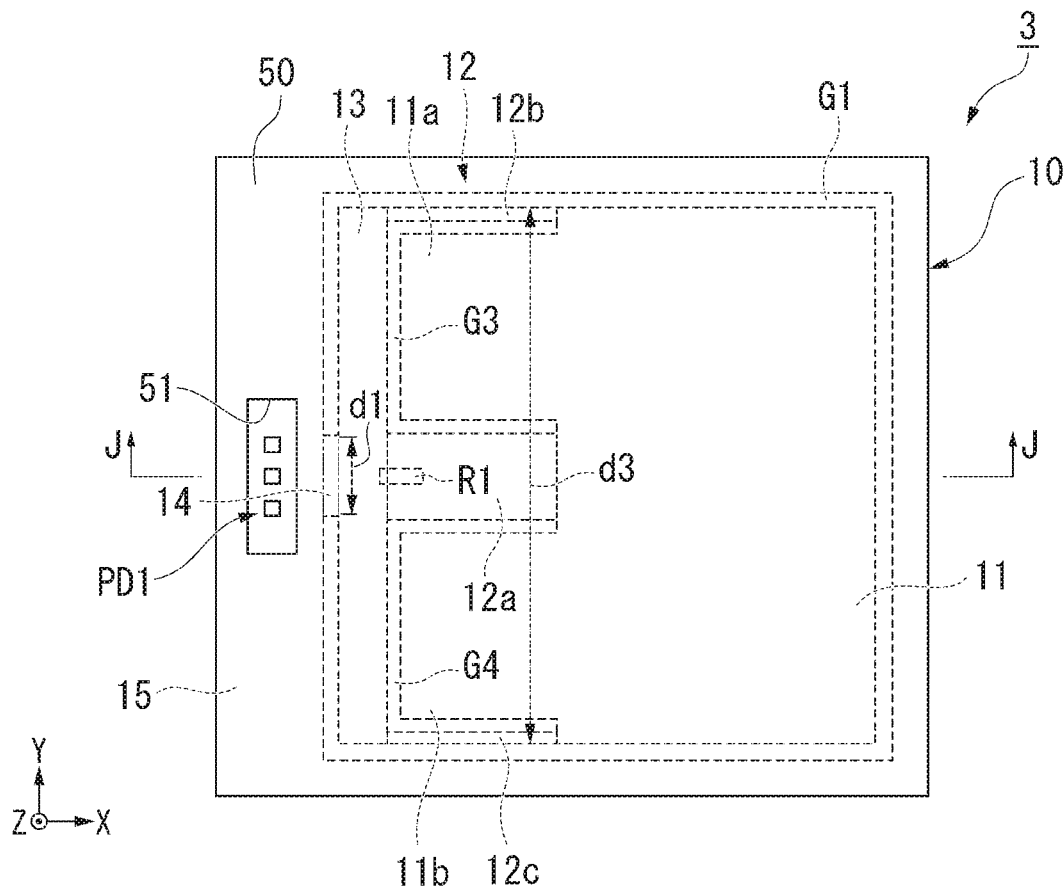
FIG. 11A is a view showing a modified example of the resonant sensor device according to the third embodiment of the present invention.
Figure 11B:
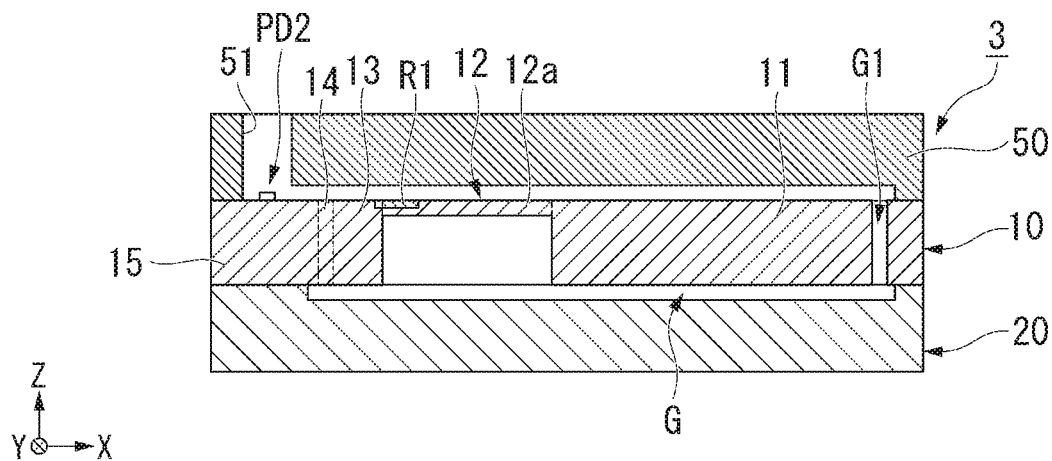
FIG. 11B is a view showing a modified example of the resonant sensor device according to the third embodiment of the present invention.

FIG. 11A and FIG. 11B are views showing a modified example of the resonant sensor device according to the third embodiment of the present invention. FIG. 11A is a plan view, and FIG. 11B is a cross-sectional view taken along line J-J in FIG. 11A. As shown in FIG. 11B, a configuration in which the gap G5 communicates with the through hole 51 can be adopted. In such a case, the gap G and the gap G5 are not sealed, and are in a state of atmospheric pressure, for example. In addition, when the gap G5 communicates with the through hole 51, the covering member 50 covers the weight 11, the supporter 12, the acceleration detecting resonator R1, and the like, and functions as a protective member that protects the weight 11, the supporter 12, the acceleration detecting resonator R1, and the like from external foreign matters. Further, even when the gap G5 communicates with the through hole 51, the covering member 50 is disposed close to the weight 11 with the gap G5 therebetween so that the gap G5 acts as a damper with respect to the weight 11 due to the squeeze film effect.

In addition, as shown in FIG. 10A, FIG. 10B, FIG. 11A, and FIG. 11B, the resonant sensor device 3 of the present embodiment does not include the temperature detecting resonator R2. In this way, a configuration that does not include the temperature detecting resonator R2 can be adopted. In this case, the aluminum pad PD2 is also omitted.

Fourth Embodiment

Figure 12A:
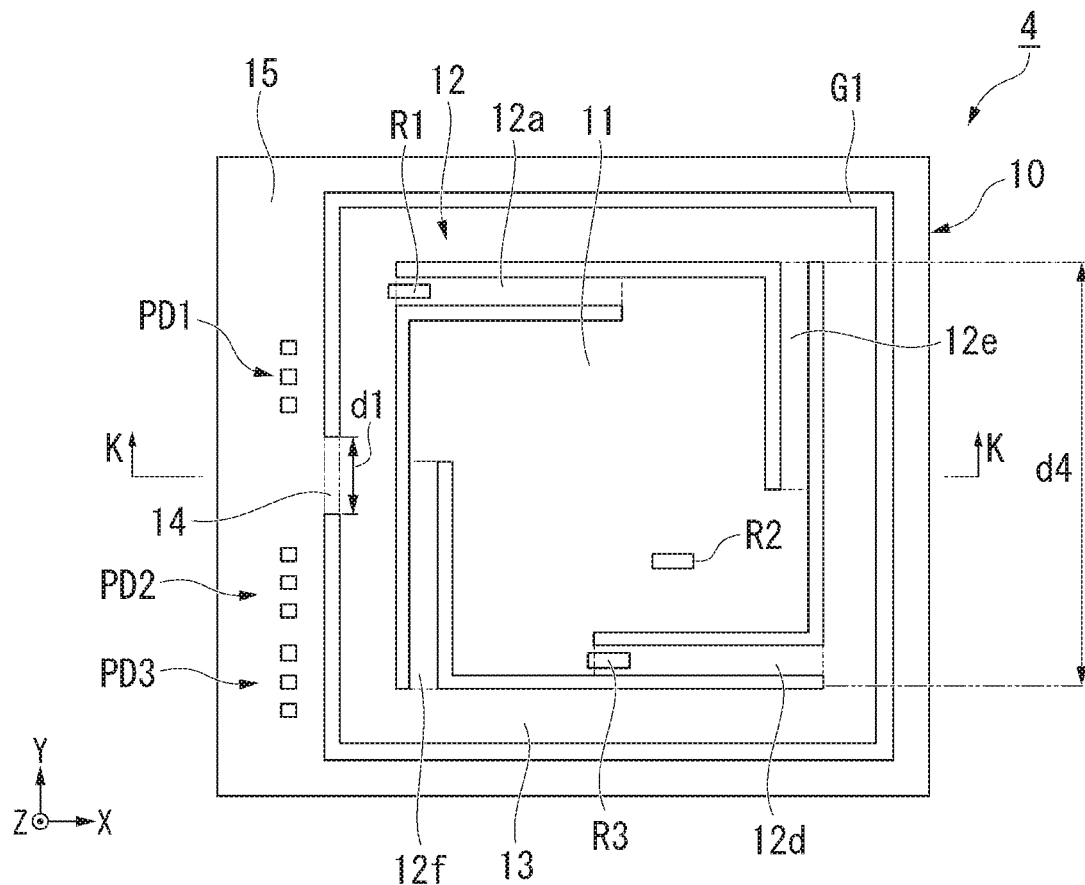
FIG. 12A is a diagram showing a resonant sensor device according to a fourth embodiment of the present invention.
Figure 12B:
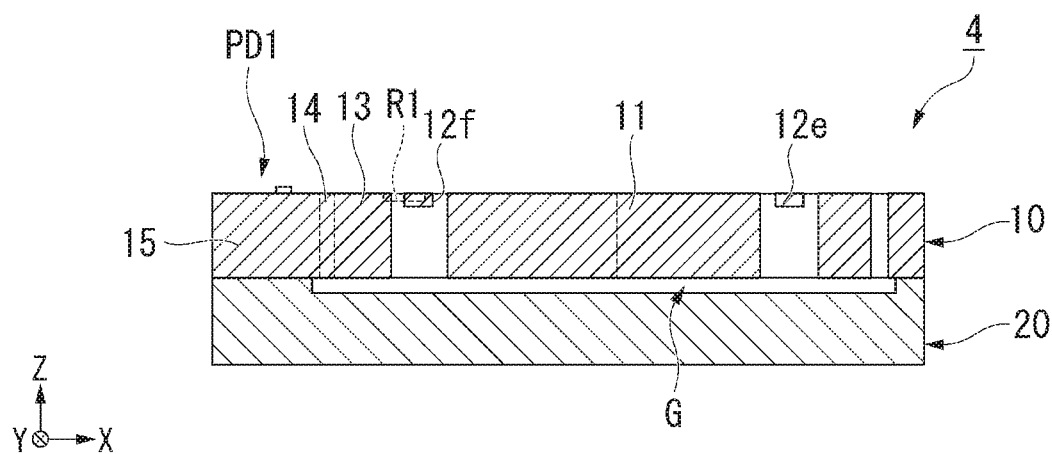
FIG. 12B is a diagram showing a resonant sensor device according to a fourth embodiment of the present invention.

FIG. 12A and FIG. 12B are diagrams showing a resonant sensor device according to a fourth embodiment of the present invention. FIG. 12A is a plan view, and FIG. 12B is a cross-sectional view taken along line K-K in FIG. 12A. Also, in FIG. 12A and FIG. 12B, components corresponding to those shown in FIG. 1A and FIG. 1B are denoted by the same reference signs. In addition, FIG. 12A and FIG. 12B are shown with the package 30 in the first embodiment omitted. As shown in FIG. 12A, in a resonant sensor device 4 of the present embodiment, the supporter 12 has a second spring portion 12d (a supporting portion), a third spring portion 12e (a supporting portion), and a fourth spring portion 12f (a supporting portion), in addition to the spring portion 12a. Further, in the resonant sensor device 4 of the present embodiment, the intermediate fixing portion 13 is formed in a quadrangular ring shape disposed to surround the weight 11 from the outside on the XY plane.

The spring portion 12a and the second spring portion 12d are provided in parallel in the Y direction and connect the weight 11 to the intermediate fixing portion 13. The second spring portion 12d is provided with a second acceleration detecting resonator R3 (resonator). Also, a structure of the second acceleration detecting resonator R3 is the same as that of the acceleration detecting resonator R1, and the description thereof will be omitted. In addition, the third spring portion 12e and the fourth spring portion 12f are provided in parallel in the X direction and connect the weight 11 to the intermediate fixing portion 13.

The spring portion 12a is formed to extend in the X direction and is connected to one corner of the weight 11 (a corner positioned in the +X direction and the +Y direction with respect to a central portion of the weight 11) and a part of the intermediate fixing portion 13 which is positioned on a −X side of the weight 11 and extends in the Y direction. On the other hand, the second spring portion 12d is formed to extend in the X direction and is connected to one corner of the weight 11 (a corner positioned in the −X direction and the −Y direction with respect to the central portion of the weight 11) and a part of the intermediate fixing portion 13 which is positioned on a +X side of the weight 11 and extends in the Y direction.

Also, the third spring portion 12e is formed to extend in the Y direction and is connected to one corner of the weight 11 (a corner positioned in the +X direction and the −Y direction with respect to the central portion of the weight 11) and a part of the intermediate fixing portion 13 which is positioned on a +Y side of the weight 11 and extends in the X direction. On the other hand, the fourth spring portion 12f is formed to extend in the Y direction and is connected to one corner of the weight 11 (a corner positioned in the −X direction and the +Y direction with respect to the central portion of the weight 11) and a part of the intermediate fixing portion 13 which is positioned on a −Y side of the weight 11 and extends in the X direction.

The third spring portion 12e and the fourth spring portion 12f described above inhibit a rotational motion of the weight 11 (a rotational motion about the X axis, a rotational motion about the Y axis, and a rotational motion about the Z axis). In this way, in the present embodiment, the four corners of the weight 11 are supported by the spring portion 12a, the second spring portion 12d, the third spring portion 12e and the fourth spring portion 12f so that the weight 11 can be relatively moved with respect to the intermediate fixing portion 13 in the Z direction.

The second spring portion 12d, the third spring portion 12e, and the fourth spring portion 12f have the same thickness dimension in the Z direction as that of the spring portion 12a and are disposed to be spaced apart from the damping member 20 in the Z direction.

The second acceleration detecting resonator R3 is embedded in the vicinity of a connection portion between the second spring portion 12d and the weight 11. In addition, an aluminum pad PD3 similar to the aluminum pad PD1 (see FIG. 1A and FIG. 1B) is provided corresponding to the second acceleration detecting resonator R3.

When acceleration acts on the resonant sensor device 4 of the present embodiment and the weight 11 is displaced in the +Z direction, all of the spring portion 12a, the second spring portion 12d, the third spring portion 12e, and the fourth spring portion 12f bend in the +Z direction. As a result, compressive strain is applied to the acceleration detecting resonator R1 embedded in the vicinity of the connection portion between the spring portion 12a and the intermediate fixing portion 13, while tensile strain is applied to the second acceleration detecting resonator R3 embedded in the vicinity of the connection portion between the second spring portion 12d and the weight 11.

On the other hand, when acceleration acts on the resonant sensor device 4 and the weight 11 is displaced in the −Z direction, all of the spring portion 12a, the second spring portion 12d, the third spring portion 12e, and the fourth spring portion 12f bend in the −Z direction. As a result, tensile strain is applied to the acceleration detecting resonator R1 embedded in the vicinity of the connection portion between the spring portion 12a and the intermediate fixing portion 13, while compressive strain is applied to the second acceleration detecting resonator R3 embedded in the vicinity of the connection portion between the second spring portion 12d and the weight 11.

As described above, in the resonant sensor device 4 of the present embodiment, the acceleration detecting resonator R1 and the second acceleration detecting resonator R3 are configured such that a strain (tensile strain or compressive strain) different from the strain (compressive strain or tensile strain) applied to one is applied to the other. For this reason, removal of common mode noise and an influence of external disturbance (for example, static pressure, temperature, etc.) can be eliminated. Also, in the resonant sensor device 4 of the present embodiment, the acceleration detecting resonator R1 and the second acceleration detecting vibration type R3 are arranged in the Y direction. For this reason, since acceleration can be detected at two different locations in the Y direction, for example, by taking the difference between these measurement results, the acceleration can be obtained more accurately. In addition, in the resonant sensor device 4 of the present embodiment, since the spring portion 12a provided with the acceleration detecting resonator R1 and the second spring portion 12d provided with the second acceleration detecting resonator R3 can be lengthened, sensitivity can be increased.

In such a supporter 12 of the present embodiment, a +Y side end portion of the third spring portion 12e is disposed on the most+Y side and a −Y side end portion of the fourth spring portion 12f is disposed on the most −Y side in the Y direction. For this reason, as shown to FIG. 12A, a maximum dimension d4 of the supporter 12 in the Y direction becomes a separation dimension from the +Y side end portion of the third spring portion 12e to the −Y side end portion of the fourth spring portion 12f. The maximum dimension d4 of the supporter 12 in the Y direction (the direction orthogonal to the direction of the connection portion 14 connected to the mounting frame 15) is wider than the maximum dimension d1 of the connection portion 14 in the Y direction. For this reason, the movements of the weight 11 in the Y direction and the X direction, that is, the movements of the weight 11 in the intersecting plane intersecting the Z direction can be inhibited as compared to a case where the maximum dimension d4 of the supporter 12 in the Y direction is equal to or less than the maximum dimension d1 of the connection portion 14 in the same direction. That is, according to the resonant sensor device 5 of the present embodiment, similarly to the resonant sensor device 1, by allowing the movement of the weight 11 only in the Z direction, the swinging motion of the weight 11 in the intersecting plane intersecting the Z direction can be inhibited. Therefore, according to the resonant sensor device 1 of the present embodiment, by making the weight 11 to be movable only in the Z direction that is the sensitivity axis for acceleration, measurement errors due to the swinging motion of the weight 11 can be reduced, thereby providing the maximum measurement performance of the acceleration detecting resonator R1.

In addition, also in the resonant sensor device 5 of the present embodiment, similarly to the resonant sensor device 1 of the first embodiment, the connection portion 14, the intermediate fixing portion 13, the supporter 12, and the weight 11 are disposed in a state of being separated from the damping member 20, and only the connection portion 14 of these portions is directly connected to the mounting frame 15 fixed to the damping member 20. For this reason, strain caused by thermal stress, stress due to an external force, or the like is input to the supporter 12 only through the connection portion 14.

Further, since the maximum dimension d1 of the connection portion 14 in the Y direction orthogonal to the direction (X direction) connected to the mounting frame 15 is smaller than the maximum dimension d4 of the supporter 12 in the same direction, strain caused by thermal stress, stress due to an external force, or the like can be prevented from being transmitted to the spring portion 12a in which the acceleration detecting resonator R1 is embedded and the second spring portion 12d in which the second acceleration detecting resonator R3 is embedded.

Also, in the resonant sensor device 4 of the present embodiment, the temperature detecting resonator R2 is embedded in the weight 11. When the temperature detecting resonator R2 is embedded into the weight 11, it is affected by acceleration, but a region where the temperature detecting resonator R2 can be installed is widened, thereby improving a degree of freedom in layout of the temperature detecting resonator R2.

Fifth Embodiment

Figure 13A:
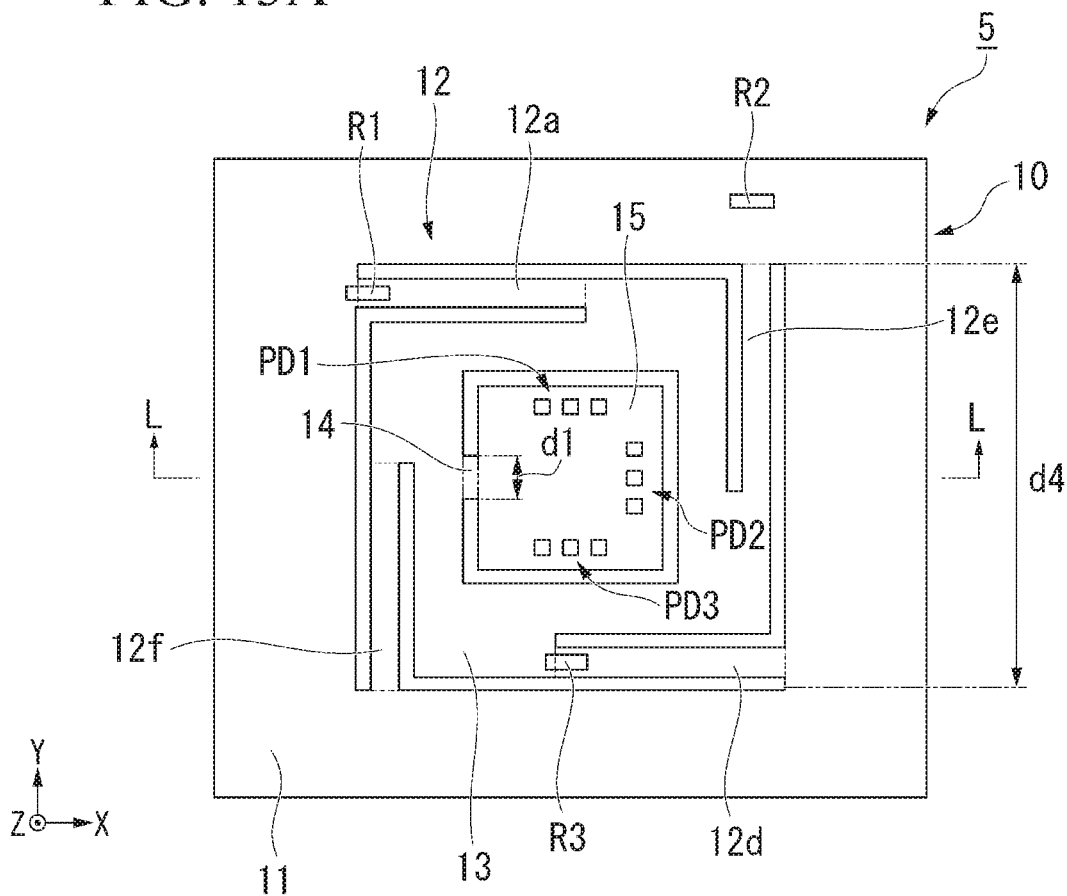
FIG. 13A is a diagram showing a resonant sensor device according to a fifth embodiment of the present invention.
Figure 13B:
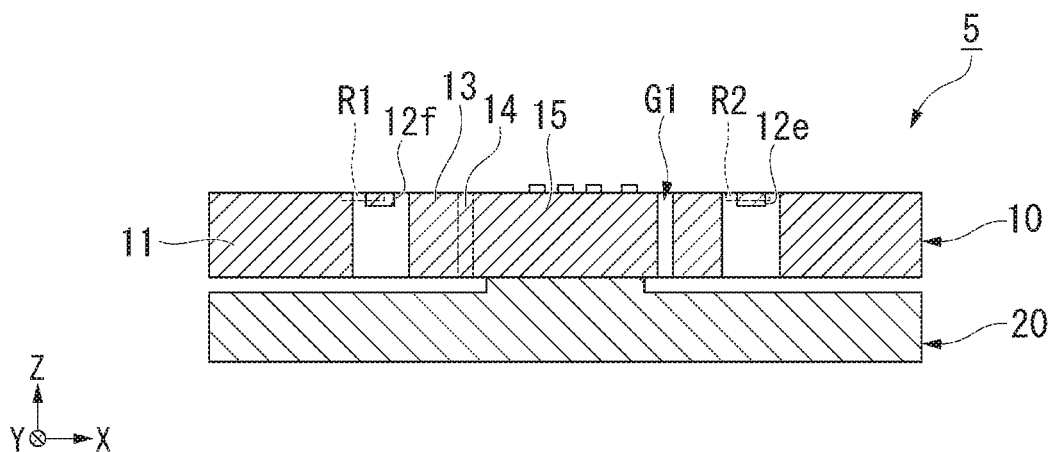
FIG. 13B is a diagram showing a resonant sensor device according to a fifth embodiment of the present invention.

FIG. 13A and FIG. 13B are diagrams showing a resonant sensor device according to a fifth embodiment of the present invention. FIG. 13A is a plan view, and FIG. 13B is a cross-sectional view taken along line L-L in FIG. 13A. Also, in FIG. 13A and FIG. 13B, components corresponding to those shown in FIG. 12A and FIG. 12B are denoted by the same reference signs. In addition, FIG. 13A and FIG. 13B are shown with the package 30 in the first embodiment omitted. As shown in FIG. 13A and FIG. 13B, a resonant sensor device 5 of the present embodiment has a different positional relationship between the weight 11 and the mounting frame 15. That is, the intermediate fixing portion 13 is formed in a quadrangular ring shape to surround a periphery of the mounting frame 15 in the XY plane, and the weight 11 is formed in a quadrangular ring shape to surround a periphery of the intermediate fixing portion 13 in the XY plane. Further, in the resonant sensor device 5 of the present embodiment, similarly to the resonant sensor device 4 shown in FIG. 12A and FIG. 12B, the weight 11 is supported by the spring portion 12a, the second spring portion 12d, the third spring portion 12e, and the fourth spring portion 12f.

Specifically, the spring portion 12a formed to extend in the X direction is connected to one corner of the intermediate fixing portion 13 (a corner positioned in the +X direction and the +Y direction with respect to the central portion of the intermediate fixing portion 13) and a part of the weight 11 which is positioned on the −X side of the intermediate fixing portion 13 and extends in the Y direction. On the other hand, the second spring portion 12d formed to extend in the X direction is connected to one corner of the intermediate fixing portion 13 (a corner positioned in the −X direction and the −Y direction with respect to the central portion of the intermediate fixing portion 13) and a part of the weight 11 which is positioned on the +X side of the intermediate fixing portion 13 and extends in the Y direction.

Also, the third spring portion 12e formed to extend in the Y direction is connected to one corner of the intermediate fixing portion 13 (a corner positioned in the +X direction and the −Y direction with respect to the central portion of the intermediate fixing portion 13) and a part of the weight 11 which is positioned on the +Y side of the intermediate fixing portion 13 and extends in the X direction. On the other hand, the fourth spring portion 12f formed to extend in the Y direction is connected to one corner of the intermediate fixing portion 13 (a corner positioned in the −X direction and the +Y direction with respect to the central portion of the intermediate fixing portion 13) and a part of the weight 11 which is positioned on the −Y side of the intermediate fixing portion 13 and extends in the X direction.

In such a resonant sensor device 5 of the present embodiment, the weight 11 is disposed on the outermost side of the acceleration detection substrate 10. For this reason, the weight 11 can be easily enlarged outward in the XY plane, and thus the weight 11 having a large mass can be easily adopted.

Sixth Embodiment

Figure 14A:
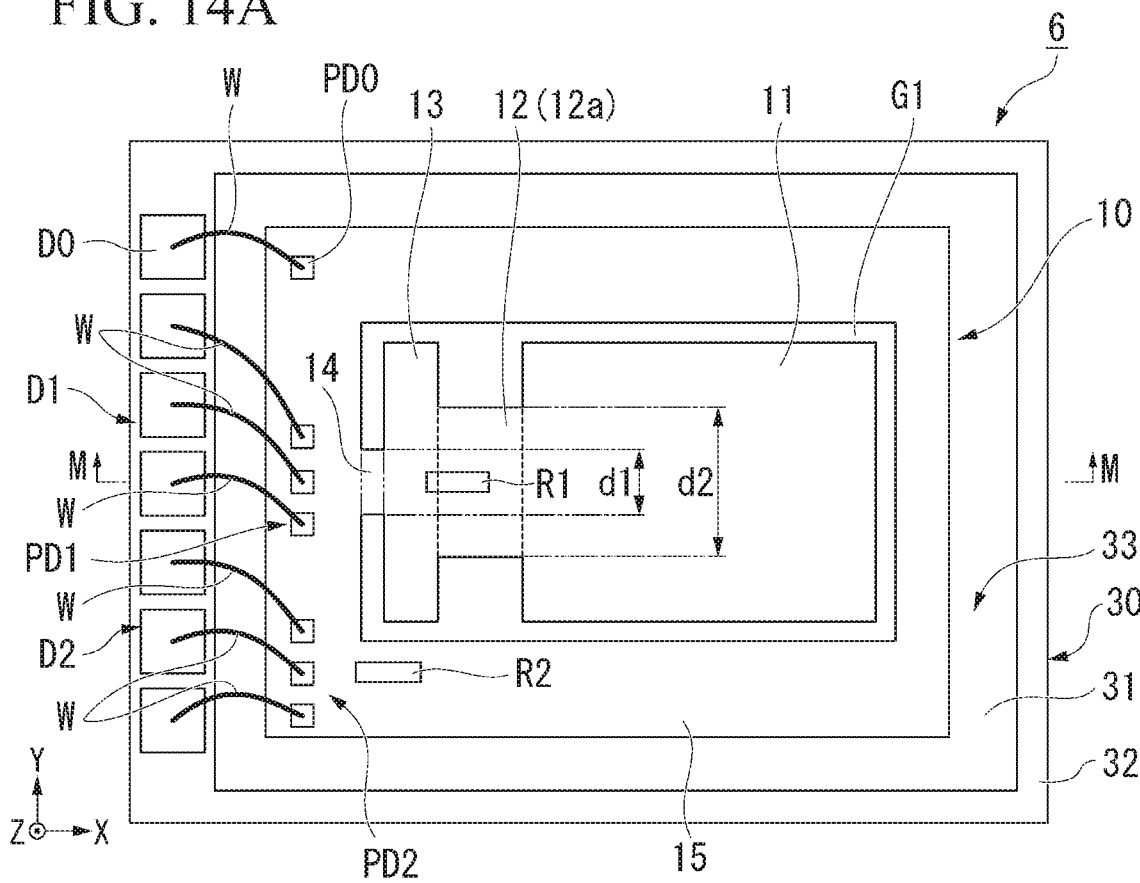
FIG. 14A is a diagram showing a resonant sensor device according to a sixth embodiment of the present invention.
Figure 14B:
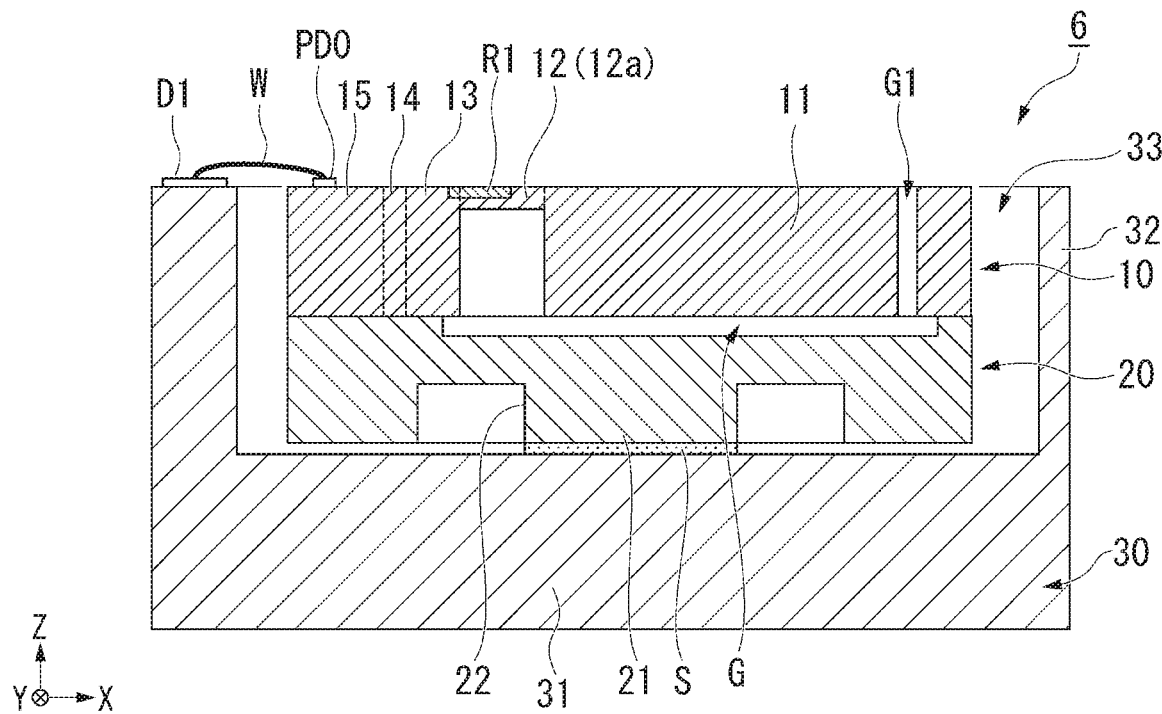
FIG. 14B is a diagram showing a resonant sensor device according to a sixth embodiment of the present invention.

FIG. 14A and FIG. 14B are diagrams showing a resonant sensor device according to a sixth embodiment of the present invention. FIG. 14A is a plan view, and FIG. 14B is a cross-sectional view taken along line M-M in FIG. 14A. Also, in FIG. 14A and FIG. 14B, components corresponding to those shown in FIG. 1A and FIG. 1B are denoted by the same reference signs. As shown in FIG. 14A and FIG. 14B, in a resonant sensor device 6 of the present embodiment, the damping member 20 has a protruding portion 21 which protrudes to a side (−Z side) opposite to the acceleration detection substrate 10 more than other portions of the damping member 20 and is fixed to the package 30. This protruding portion 21 is disposed at a center of the damping member 20 in a plan view, and is fixed to a bottom portion 31 of the package 30 so that an edge portion of the damping member 20 is spaced apart from the package 30 in the Z direction.

According to the resonant sensor device 6 of the present embodiment, a contact area between the damping member 20 and the package 30 can be reduced as compared to a case where the entire lower surface of the damping member 20 is joined to the package 30. Therefore, according to the resonant sensor device 6 of the present embodiment, it is possible to reduce thermal stress generated at a boundary portion between the damping member 20 and the package 30.

Further, in the resonant sensor device 6 of the present embodiment, the damping member 20 has an annular groove portion 22 provided to surround the protruding portion 21. The annular groove portion 22 is provided on a bottom surface side of the damping member 20 and is formed to be recessed from the package 30 side (−Z side) toward the acceleration detection substrate 10 side (+Z side). Since stress is not transmitted inside the annular groove portion 22 by providing the annular groove portion 22, it is possible to prevent the thermal stress generated at the boundary portion between the damping member 20 and the package 30 from being transmitted to the acceleration detection substrate 10.

Seventh Embodiment

Figure 15A:
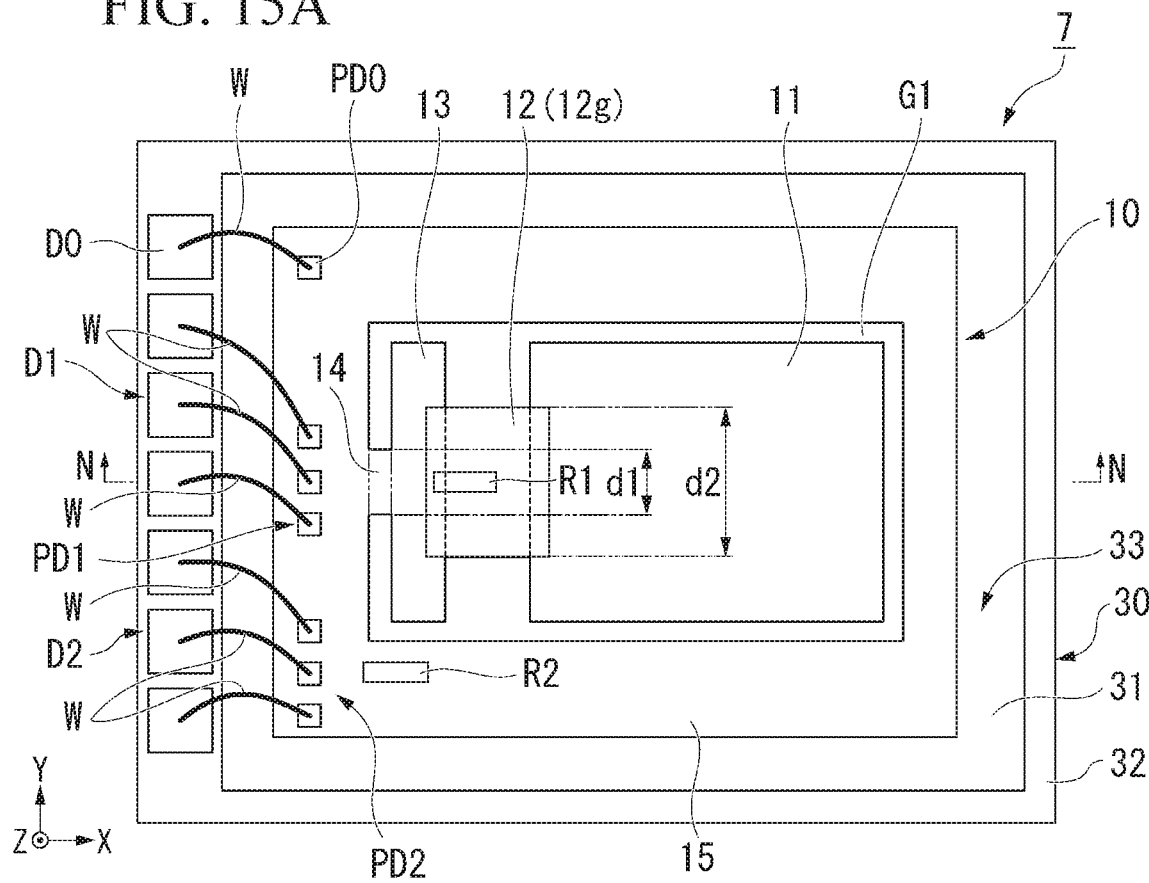
FIG. 15A is a diagram showing a resonant sensor device according to a seventh embodiment of the present invention.
Figure 15B:
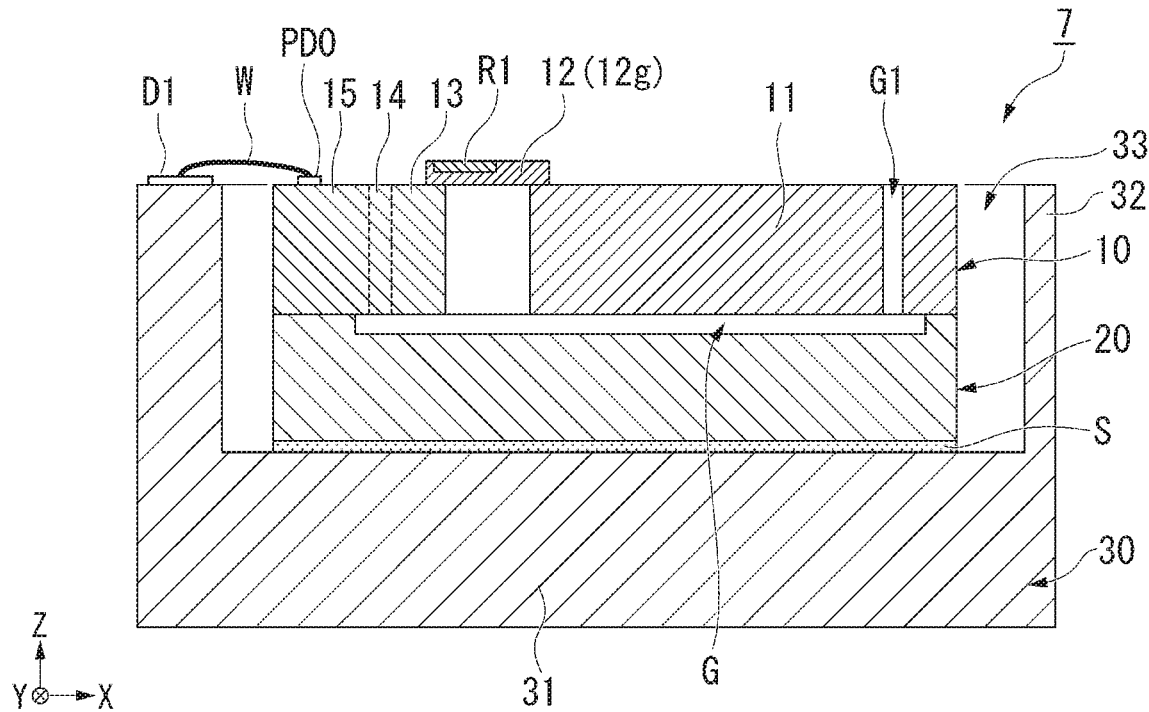
FIG. 15B is a diagram showing a resonant sensor device according to a seventh embodiment of the present invention.

FIG. 15A and FIG. 15B are diagrams showing a resonant sensor device according to a seventh embodiment of the present invention. FIG. 15A is a plan view, and FIG. 15B is a cross-sectional view taken along line N-N in FIG. 15A. Also, in FIG. 15A and FIG. 15B, components corresponding to those shown in FIG. 1A and FIG. 1B are denoted by the same reference signs. As shown in FIG. 15A and FIG. 15B, a resonant sensor device 7 of the present embodiment attaches a spring substrate 12g (a supporting portion), in which the acceleration detecting resonator R1 is embedded, to the weight 11 and the intermediate fixing portion 13, thereby supporting the weight 11 to be movable in the Z direction. That is, in the present embodiment, the supporter 12 is configured of the single spring substrate 12g. The spring substrate 12g has a thickness similar to that of the spring portion 12a shown in FIG. 1A and FIG. 1B, and is a substrate made of, for example, silicon.

According to the resonant sensor device 7, a part provided with the acceleration detecting resonator R1 which needs to be processed with higher processing accuracy can be manufactured separately from the other parts. For this reason, the weight 11, the intermediate fixing portion 13 and the like whose dimensional errors are within an allowable range can be inhibited from not being used due to processing defects of the acceleration detection substrate 10.

As described above, although the preferred embodiments of the present invention have been described with reference to the accompanying drawings, the present invention is not limited to the embodiments described above. It should be understood that all the shapes, combinations, and the like of each constituent member shown in the above-described embodiments are examples, and various modifications can be made based on design requirements and the like without departing from the spirit of the present invention. For example, the number of spring portions included in the supporter 12 shown in the above embodiments is an example and can be set to a single or a plurality of arbitrary numbers. In addition, in the above embodiments, although the configuration in which tensile stress is applied to the acceleration detecting resonator R1 and the second acceleration detecting resonator R3 has been described, a configuration in which no tensile stress is applied to the acceleration detecting resonator R1 and the second acceleration detecting resonator R3 may also be adopted.

Also, for example, even when the maximum dimension d1 of the connection portion 14 in the Y direction is equal to or greater than the maximum dimension (the maximum dimension d2 in the first embodiment, the sixth embodiment, and the seventh embodiment, the maximum dimension d3 in the second embodiment and the third embodiment, and the maximum dimension d4 in the fourth embodiment and the fifth embodiment) of the supporter 12 in the same direction, strain caused by thermal stress, stress due to an external force, or the like can be inhibited even a little from being transmitted to the spring portion 12a in which the acceleration detecting resonator R1 is embedded if the dimension of the connection portion 14 in the X direction is sufficiently larger than the dimension in the Y direction.

Also, for example, even when the damping member 20 is physically joined to the connection portion 14, strain caused by thermal stress, stress due to an external force, or the like can be inhibited even slightly from being transmitted to the spring portion 12a in which the acceleration detecting resonator R1 is embedded if the intermediate fixing portion 13 is separated from the damping member 20 in the Z direction.

[Supplementary Note]

A first invention is a resonant sensor device which includes a base, and a detection substrate supported by being at least partially fixed to the base, wherein the detection substrate includes a movable portion configured to move in a first direction, and is disposed away from the base in the first direction, a supporter including one or more supporting portions which extend in a direction along an intersecting plane intersecting the first direction, the supporter being disposed away from the base in the first direction, an intermediate fixing portion which is connected to the movable portion via the supporter, the intermediate fixing portion being disposed away from the base in the first direction, a connection portion which connects a mounting portion fixed to the base to the intermediate fixing portion in a second direction that is one direction along the intersecting plane, the connection portion being disposed away from the base in the first direction, and a resonator at least partially embedded in the one or more supporting portions, wherein a maximum dimension of the connection portion in a third direction orthogonal to the second direction in the intersecting plane is smaller than a maximum dimension of the supporter in the third direction.

A second invention is the resonant sensor device in which, in the first invention, a thickness dimension of the connection portion in the first direction is larger than a thickness dimension of the one or more supporting portions in the first direction.

A third invention is the resonant sensor device in which, in the first or second invention, a thickness dimension of the intermediate fixing portion in the first direction is larger than a thickness dimension of the one or more supporting portions in the first direction.

A fourth invention is the resonant sensor device in which, in any one of the first to third inventions, the resonator vibrates in the third direction intersecting the first direction and the second direction.

A fifth invention is the resonant sensor device in which, in any one of the first to fourth inventions, the movable portion, the supporter, the intermediate fixing portion, the connection portion, and the resonator are formed integrally using a silicon material.

A sixth invention is the resonant sensor device in which, in the fifth invention, the resonator is a beam-shaped member formed to extend in a direction in which the one or more supporting portions extend, and the resonator is disposed in a space at least partially formed inside the one or more supporting portions in a state where both ends of the resonator are fixed.

A seventh invention is the resonant sensor device in which, in any one of the first to sixth inventions, the detection substrate includes a temperature detecting resonator which detects temperature.

An eighth invention is the resonant sensor device in which, in the seventh invention, the temperature detecting resonator is embedded in any one of the movable portion, the intermediate fixing portion, and the connection portion.

A ninth invention is the resonant sensor device in which, in any one of the first to eighth inventions, the base includes a damping member disposed close to the movable portion, the intermediate fixing portion, and the connection portion with predetermined gaps therebetween.

A tenth invention is the resonant sensor device in which, in any one of the first to ninth inventions, the detection substrate includes a pad conducted to the outside, and the base includes a package having an electrode electrically connected to the pad.

A eleventh invention is the resonant sensor device in which, in the ninth invention, the detection substrate includes a pad conducted to the outside, the base includes a package having an electrode electrically connected to the pad, and the damping member includes a protruding portion that protrudes to a side opposite to the detection substrate further than other portions of the damping member, and the protruding portion is fixed to the package.

A twelfth invention is the resonant sensor device in which, in the eleventh invention, an annular groove portion is formed in the damping member to surround the protruding portion.

A thirteenth invention is the resonant sensor device in which, in any one of the first to twelfth inventions, the resonator is vacuum-sealed.

A fourteenth invention is the resonant sensor device in which, in the twelfth invention, the resonator is vacuum-sealed, and a sealing pressure of the resonator is different from a pressure in the gaps.

A fifteenth invention is the resonant sensor device in which, in any one of the first to fourteenth inventions, a part of the resonators arranged in a direction intersecting the second direction is embedded in at least one of the supporting portions.

A sixteenth invention is the resonant sensor device in which, in any one of the first to fifteenth inventions, the intermediate fixing portion is formed to surround a periphery of the movable portion in the intersecting plane.

A seventeenth invention is the resonant sensor device further includes, in any one of the first to sixteenth inventions, a sealing portion which is joined to the mounting portion, the sealing portion sealing the movable portion, the supporter, the intermediate fixing portion, the connection portion, and the resonator.

An eighteenth invention is the resonant sensor device in which, in any one of the first to fifteenth inventions, the movable portion is formed to surround a periphery of the intermediate fixing portion in the intersecting plane.

A nineteenth invention is the resonant sensor device in which, in any one of the first to eighteenth inventions, both ends of the one or more supporting portions in which the resonator is embedded are bonded to the movable portion and the intermediate fixing portion, respectively.

A twentieth invention is the resonant sensor device in which, in any one of the first to nineteenth inventions, impurities having atomic radius smaller than atomic radius of the silicon material are diffused into the resonator, and a tensile stress is applied to the resonator in the second direction.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A resonant sensor device comprising:
   a base; and
   a detection substrate supported by being at least partially fixed to the base,
   wherein the detection substrate comprises:
       a movable portion configured to move in a first direction, and is disposed away from the base in the first direction;
       a supporter comprising one or more supporting portions which extend in a direction along an intersecting plane intersecting the first direction, the supporter being disposed away from the base in the first direction;
       an intermediate fixing portion which is connected to the movable portion via the supporter, the intermediate fixing portion being disposed away from the base in the first direction;
       a connection portion which connects a mounting portion fixed to the base to the intermediate fixing portion in a second direction that is one direction along the intersecting plane, the connection portion being disposed away from the base in the first direction; and
       a resonator at least partially embedded in the one or more supporting portions,
   wherein a maximum dimension of the connection portion in a third direction orthogonal to the second direction in the intersecting plane is smaller than a maximum dimension of the supporter in the third direction.

2. The resonant sensor device according to claim 1, wherein a thickness dimension of the connection portion in the first direction is larger than a thickness dimension of the one or more supporting portions in the first direction.

3. The resonant sensor device according to claim 1, wherein a thickness dimension of the intermediate fixing portion in the first direction is larger than a thickness dimension of the one or more supporting portions in the first direction.

4. The resonant sensor device according to claim 1, wherein the resonator vibrates in the third direction intersecting the first direction and the second direction.

5. The resonant sensor device according to claim 1, wherein the movable portion, the supporter, the intermediate fixing portion, the connection portion, and the resonator are formed integrally using a silicon material.

6. The resonant sensor device according to claim 5, wherein the resonator is a beam-shaped member formed to extend in a direction in which the one or more supporting portions extend, and the resonator is disposed in a space at least partially formed inside the one or more supporting portions in a state where both ends of the resonator are fixed.

7. The resonant sensor device according to claim 1, wherein the detection substrate comprises a temperature detecting resonator which detects temperature.

8. The resonant sensor device according to claim 7, wherein the temperature detecting resonator is embedded in any one of the movable portion, the intermediate fixing portion, and the connection portion.

9. The resonant sensor device according to claim 1, wherein the base comprises a damping member disposed close to the movable portion, the intermediate fixing portion, and the connection portion with predetermined gaps therebetween.

10. The resonant sensor device according to claim 1, wherein the detection substrate comprises a pad conducted to the outside, and
wherein the base comprises a package having an electrode electrically connected to the pad.

11. The resonant sensor device according to claim 9, wherein the detection substrate comprises a pad conducted to the outside,
wherein the base comprises a package having an electrode electrically connected to the pad, and wherein the damping member comprises a protruding portion that protrudes to a side opposite to the detection substrate further than other portions of the damping member, and the protruding portion is fixed to the package.

12. The resonant sensor device according to claim 11, wherein an annular groove portion is formed in the damping member to surround the protruding portion.

13. The resonant sensor device according to claim 1, wherein the resonator is vacuum-sealed.

14. The resonant sensor device according to claim 12, wherein the resonator is vacuum-sealed, and
wherein a sealing pressure of the resonator is different from a pressure in the gaps.

15. The resonant sensor device according to claim 1, wherein a part of the resonators arranged in a direction intersecting the second direction is embedded in at least one of the supporting portions.

16. The resonant sensor device according to claim 1, wherein the intermediate fixing portion is formed to surround a periphery of the movable portion in the intersecting plane.

17. The resonant sensor device according to claim 1, further comprising:
a sealing portion which is joined to the mounting portion, the sealing portion sealing the movable portion, the supporter, the intermediate fixing portion, the connection portion, and the resonator.

18. The resonant sensor device according to claim 1, wherein the movable portion is formed to surround a periphery of the intermediate fixing portion in the intersecting plane.

19. The resonant sensor device according to claim 1, wherein both ends of the one or more supporting portions in which the resonator is embedded are bonded to the movable portion and the intermediate fixing portion, respectively.

20. The resonant sensor device according to claim 5, wherein impurities having atomic radius smaller than atomic radius of the silicon material are diffused into the resonator, and a tensile stress is applied to the resonator in the second direction.

* * * * *